(12) United States Patent
Gillette et al.

(10) Patent No.: US 10,375,977 B2
(45) Date of Patent: Aug. 13, 2019

(54) SYSTEMS AND METHODS FOR PROVIDING FOOD INTERVENTION AND TENDERIZATION

(71) Applicants: Zane M. Gillette, Burley, ID (US); Thomas D. Gillette, Burley, ID (US); James M. Gillette, Burley, ID (US); C. Brennan Jones, Burley, ID (US); David Haskell, Burley, ID (US); Jared Reid, Burley, ID (US); Victor Rodriguez, Burley, ID (US); Tyler Hepworth, Burley, ID (US)

(72) Inventors: Zane M. Gillette, Burley, ID (US); Thomas D. Gillette, Burley, ID (US); James M. Gillette, Burley, ID (US); C. Brennan Jones, Burley, ID (US); David Haskell, Burley, ID (US); Jared Reid, Burley, ID (US); Victor Rodriguez, Burley, ID (US); Tyler Hepworth, Burley, ID (US)

(73) Assignee: S21, LLC, Burley, ID (US)

( * ) Notice: Subject to any disclaimer, the term of this patent is extended or adjusted under 35 U.S.C. 154(b) by 517 days.

(21) Appl. No.: 15/161,005

(22) Filed: May 20, 2016

(65) Prior Publication Data
US 2016/0338392 A1 Nov. 24, 2016

Related U.S. Application Data

(60) Provisional application No. 62/198,975, filed on Jul. 30, 2015, provisional application No. 62/165,845, filed on May 22, 2015.

(51) Int. Cl.
*A23B 4/28* (2006.01)
*A23L 3/3589* (2006.01)
(Continued)

(52) U.S. Cl.
CPC ............ *A23L 3/3589* (2013.01); *A22C 9/001* (2013.01); *A22C 17/0053* (2013.01); *A23B 4/28* (2013.01); *A23B 7/158* (2013.01); *A23L 3/003* (2013.01)

(58) Field of Classification Search
CPC .......... A23B 4/28; A23L 3/3589; A22C 9/001
See application file for complete search history.

(56) References Cited

U.S. PATENT DOCUMENTS 3,675,567 A * 7/1972 Rejsa .................. A23B 4/0235
99/533
5,591,344 A 1/1997 Kenley et al.
(Continued)

*Primary Examiner* — Dana Ross
*Assistant Examiner* — Lawrence H Samuels
(74) *Attorney, Agent, or Firm* — David B. Tingey; Bryant J. Keller; Kirton McConkie

(57) ABSTRACT

Systems and methods for providing food intervention, pumping up, and tenderization are discussed. While such systems and methods can include any suitable component, in some cases, they include an injectade reservoir, a filter, a first pump configured to force injectade from the injectade reservoir and through the filter, a nozzle configured to inject injectade into a food product without having the nozzle contact the food, and a valve that is configured to selectively open and close to regulate when and how much of the injectade that passes through the filter is forced out of the nozzle. In some cases, the described systems further include a chiller configured to cool injectade in the reservoir, a sensor configured to determine a distance between the nozzle and food item, an actuator configured to move the nozzle, and/or a computer processor that controls an amount of injectade sprayed from the nozzle. Other implementations are described.

22 Claims, 33 Drawing Sheets

(51) Int. Cl.
*A22C 9/00* (2006.01)
*A23B 7/158* (2006.01)
*A23L 3/00* (2006.01)
*A22C 17/00* (2006.01)

(56) References Cited

U.S. PATENT DOCUMENTS

| | | | | |
|---|---|---|---|---|
| 6,763,760 B2* | 7/2004 | Hansen | | A23B 4/00 99/487 |
| 6,976,421 B2* | 12/2005 | Hansen | | A23B 4/00 99/487 |
| 7,284,477 B2* | 10/2007 | Hansen | | A23B 4/20 99/516 |
| 7,415,428 B2* | 8/2008 | Garwood | | A23B 4/16 426/392 |
| 7,837,766 B2* | 11/2010 | Gillette | | A23L 3/358 210/188 |
| 7,968,135 B2* | 6/2011 | Hansen | | A23B 4/20 426/281 |
| 8,122,819 B2* | 2/2012 | Hansen | | A23B 4/00 99/487 |
| 2003/0005831 A1* | 1/2003 | Hansen | | A23B 4/00 99/532 |
| 2003/0167934 A1* | 9/2003 | Hansen | | A23B 4/00 99/532 |
| 2003/0170357 A1* | 9/2003 | Garwood | | A23B 4/16 426/392 |
| 2004/0202756 A1* | 10/2004 | Holzschuh | | A23B 4/044 426/321 |
| 2004/0221746 A1* | 11/2004 | Hansen | | A23B 4/20 99/532 |
| 2004/0258799 A1* | 12/2004 | Hansen | | A23B 4/00 426/58 |
| 2005/0181720 A1* | 8/2005 | Osborn | | A22B 5/0082 452/173 |
| 2008/0044526 A1* | 2/2008 | Hansen | | A23B 4/20 426/231 |
| 2009/0249964 A1* | 10/2009 | Petursson | | A22C 9/001 99/533 |
| 2010/0323072 A1 | 12/2010 | Bernstein et al. | | |
| 2011/0052765 A1* | 3/2011 | Lyden | | A23B 4/28 426/231 |

* cited by examiner

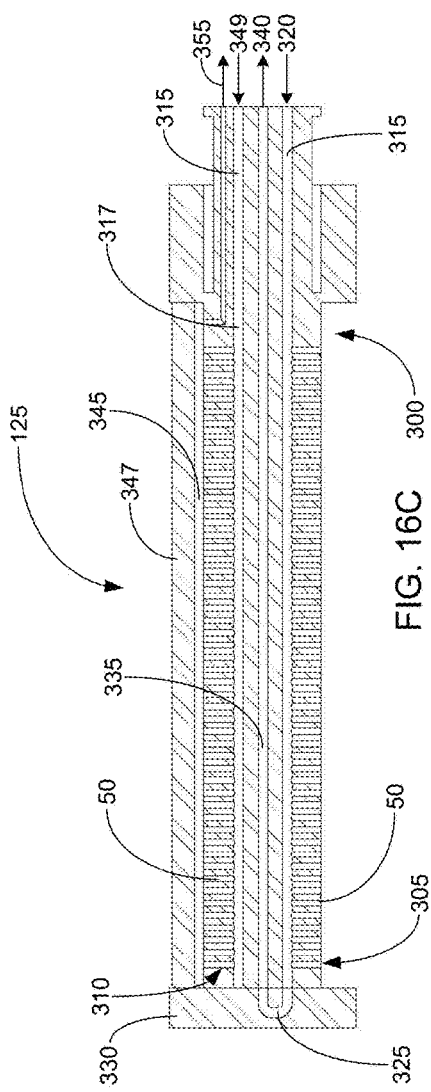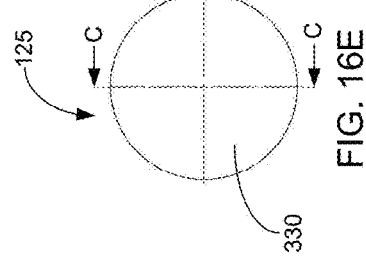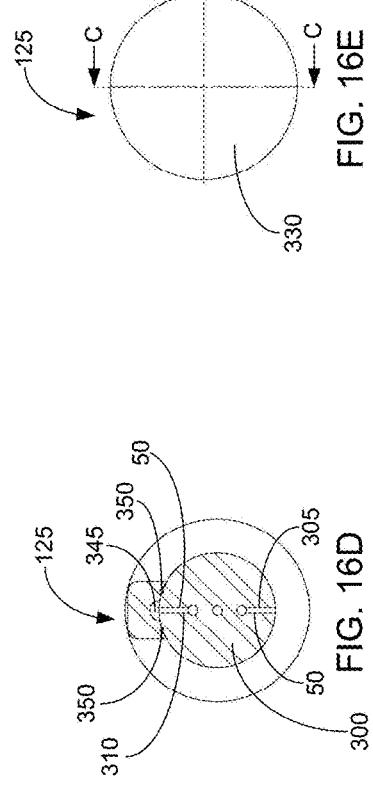

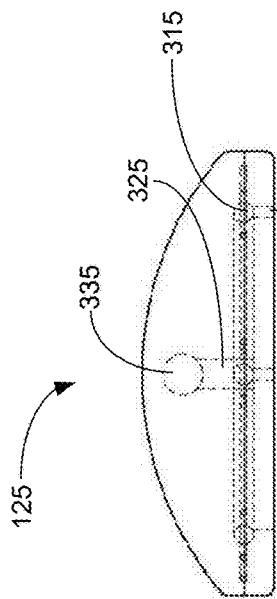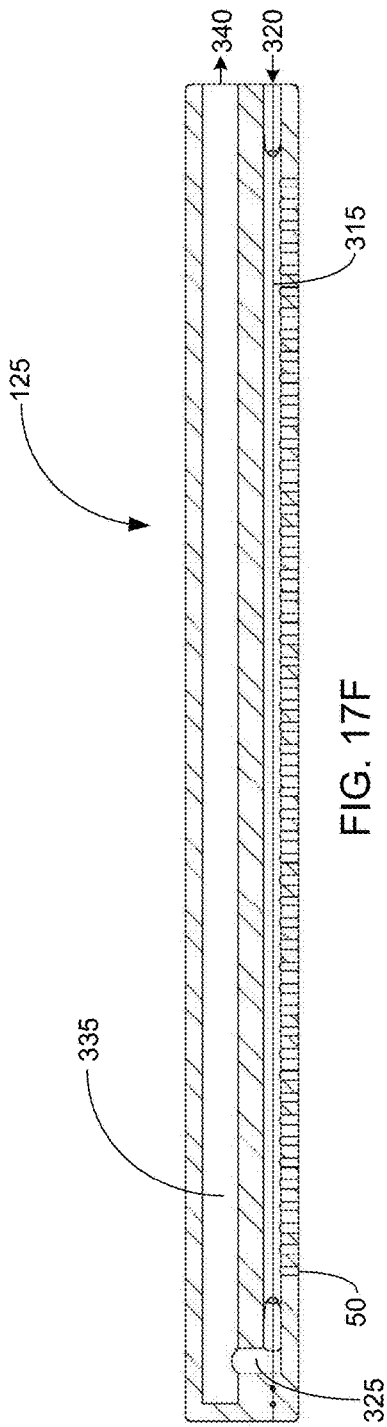

SYSTEMS AND METHODS FOR PROVIDING FOOD INTERVENTION AND TENDERIZATION

RELATED APPLICATIONS

This application claims priority to U.S. Provisional Patent Application Ser. No. 62/165,845, filed May 22, 2015, and entitled SYSTEMS AND METHODS FOR PROVIDING FOOD INTERVENTION AND TENDERIZATION, as well as to U.S. Provisional Patent Application Ser. No. 62/198,975, filed Jul. 30, 2015, and entitled SYSTEMS AND METHODS FOR PROVIDING FOOD INTERVENTION AND TENDERIZATION; the entire disclosures of which are both incorporated herein by reference.

BACKGROUND OF THE INVENTION

Field of the Invention

The present invention relates to food treatment. More particularly, some implementations of the described invention relate to systems and methods for injecting (and/or otherwise applying) an injectade to a food product to tenderize, limit microbial growth in (or provide intervention to), color, flavor, freeze, chill, increase a weight of, pump up, provide uptake to, improve a value of, and/or otherwise treat the food product.

Background and Related Art

Some foods (such as some cuts of meat) can have a relatively large amount of connective tissue and can otherwise be relatively hard to cut and tough to chew. Additionally, many foods can contain (or be covered with) bacteria, viruses, parasites, microbes, debris, and/or other pathogens that can make their consumption undesirable and even dangerous. In one example of how some foods become contaminated with such pathogens, as many meats, cheeses, types of produce, and other foods are cut before being sold, the exposed surfaces of some such foods can come in contact with and/or otherwise become contaminated with bacteria, fungi, microbes, and/or other pathogens. In another example, as many foods are grown, raised, and/or harvested, they are exposed to environmental factors (such as feces; environmental parasites, protozoa, and other contaminants; dirty hands and machinery; and a variety of other pathogen sources) that cause the foods to become contaminated.

In an effort to make some relatively tough foods more readily edible and even desirable and/or to reduce pathogen contamination in some foods, many people have developed a variety of food treatment techniques. For instance, in order to tenderize some foods, several techniques exist for providing mechanical tenderization (such as pounding meat with a meat mallet, vacuum tumbling, or otherwise), thermal tenderization (such as slow cooking meat at a relatively low temperature), and enzymatic tenderization (such as marinating a piece of meat in enzymes that are configured to break down collagen and other connective tissue). Furthermore, to reduce pathogen contamination in food, many practices have been developed, including the practice of exposing food to ionizing radiation, exposing the food to one or more preservatives, processing the food with a retort, using pressure cooking to treat the food, treating the food through high pressure processing (of HPP), cooking foods until they are "well done", and washing foods with a decontaminant.

Although current systems and methods for tenderizing and/or decontaminating foods may provide a variety of benefits, such systems and methods are not necessarily without their shortcomings. In one example of such a shortcoming, while some methods for tenderizing meat do break down connective tissues in the meat, such methods can further break down, smash, cut, puncture, dissolve, and otherwise leave the meat with an unappetizing appearance, texture, or other characteristic. In another example, in some instances in which one or more needles are stabbed into a piece of food to allow a tenderizing agent to be injected into the food, the needles can be a means of passing contamination to the food they are used to tenderize. Additionally, in this example, the needles can be stabbed into bones, where they can break off pieces of the bones, or become plugged with the bones, tendons, and/or other connective tissue. Similarly, in some methods for decontaminating foods, the foods are: visibly damaged (for instance, through the use of the needles discussed above), only partially decontaminated (for instance, cleaned on the outside but not on the inside), subjected to radiation treatments, and/or are otherwise cleaned in a manner that lessens the food's appeal to consumers.

Thus, while systems and methods currently exist that are used to tenderize, pump up, and/or decontaminate foods, challenges still exist, including those listed above. Accordingly, it would be an improvement in the art to augment or even replace current techniques with other techniques.

SUMMARY OF THE INVENTION

The present invention relates to systems and methods for treating food products. More particularly, some implementations relate to systems and methods for injecting (and/or otherwise applying) an injectade to a food product to: tenderize, limit microbial growth in (or provide intervention to), color, flavor, freeze, chill, preserve, increase a weight of, modify a density of, improve an aesthetic appearance of, change a texture of, change a moisture content, pump up, change a nutrient content of, and/or to otherwise treat the food product. While the described systems and methods can include any suitable component, in some cases, they include an injectade reservoir; a filter; a first pump (or an injection pump) configured to force injectade from the injectade reservoir through the filter, through a pressure regulator, and to a nozzle (e.g., and/or a set of nozzles on a nozzle head) that is configured to inject injectade into a food product without having the nozzle contact the food; and a nozzle dwell time valve (also referred to as a shot valve) that is configured to selectively open and close to regulate when and how much of the injectade that passes through the filter is forced out of the nozzle. In some cases, the described system further includes at least one of a chiller configured to cool injectade in the reservoir, a sensor configured to determine a distance between the nozzle and the food item (or vice versa), an actuator and/or any other suitable mechanical movement device configured to move the nozzle into proximity with the food product (and/or to move the food product into proximity with the nozzle), and/or a computer processor that controls an amount of injectade sprayed from the nozzle.

In some other implementations, the described food product treatment system comprises an injectade reservoir; a filter; a first pump configured to force injectade from the injectade reservoir through the filter; an injection nozzle, a pulsation nozzle, a continuous cleaning nozzle, and/or any other suitable spray nozzle that is configured to inject the injectade into (and/or to otherwise apply the injectade to) a food product without requiring the spray nozzle (or a portion thereof, such as a needle) to contact the food product; a valve that is configured to selectively open and close to regulate when and how much of the injectade is sprayed from the nozzle; a conduit system configured to pass the injectade from the reservoir, through the filter, and out of the spray nozzle; a chamber that is configured to contain the food product as the injectade is sprayed from the spray nozzle into the food product; and/or a demister that is configured to draw water vapor from within the chamber.

In still other implementations, the described systems include an injectade reservoir configured to cool injectade disposed therein (e.g., via one or more glycol chillers, chilled conduits, refrigeration systems, liquid cooling systems (such as liquid to liquid, closed loop dry, closed-loop dry system with trim cooling, open-loop evaporative, closed loop evaporative, chilled water, and/or other liquid cooling systems), and/or otherwise); a filter; a spray nozzle that is configured to inject injectade into a food product without requiring a portion of the spray nozzle to contact the food product; a first pump configured to force the injectade from the injectade reservoir through the filter and to the spray nozzle; a valve that is configured to selectively open and close to regulate when and how much of the injectade is forced out of the nozzle; a chamber that is configured to contain the food product as the injectade is sprayed from the spray nozzle into the food product; a first pressure sensor configured to measure pressure of the injectade prior to passing the valve; a second pressure sensor configured to measure pressure of the injectade after passing the valve and before being forced from the spray nozzle; a demister that is configured to draw vapor from within the chamber; and a computer processor, wherein the processor is configured to control when and how much of the injectade is forced out of the nozzle.

In some implementations, a set of nozzles are disposed at a nozzle head in the system. While such a nozzle head can have any suitable component or characteristic that allows it to apply (e.g., inject) injectade to a food product, in some implementations, the head comprises one or more channels that direct injectade (and/or any other suitable fluid) to the nozzles, with one or more risers extending from, and in fluid communication with, the channels. In this regard, the risers can comprise any channel, recess, tubing, piping, and/or other feature that allows one or more gases (e.g., air) that are introduced into the nozzle head with the injectade to rise above the injectade in the channel and be vented out (e.g., to the injectade tank, a drain, etc.) of the nozzle head without being forced through one or more nozzles. Additionally, while the risers can be disposed in any suitable portion of the heads, in some embodiments, they are disposed at a far end of the head (e.g., near an exit end or otherwise). Accordingly, in some implementations, by allowing air to vent from one or more channels in the nozzle head, the nozzle head is configured to deliver a consistent and predicable amount of injectade.

While the methods and processes of the present invention may be particularly useful for tenderizing, pumping up, and/or decontaminating food products, those skilled in the art will appreciate that the described systems and methods can be used in a variety of different applications and in a variety of different areas of manufacture. For instance, the described systems and methods can be used to provide a desired color, flavor, shelf-life, aroma, palatability, presentation, appearance, value, weight, pump up, size, density, texture, nutrient content, mineral content, moisture content, temperature, and/or other characteristic to a food product.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings are not necessarily drawn to scale or in proper proportion, and that the drawings depict only typical embodiments of the present invention and are not, therefore, to be considered as limiting the scope of the invention, the present invention will be described and explained with additional specificity and detail through the use of the accompanying drawings in which:

FIG. 16C illustrates a cross-sectional view of the spray nozzle of FIG. 16B, taken along line A-A of FIG. 16B;

FIG. 16D illustrates a cross-sectional view of a representative embodiment of the spray nozzle head, taken along line B-B in FIG. 16B;

FIG. 16E illustrates an end schematic view of a representative embodiment of the spray nozzle head;

FIGS. 17C-17F each illustrate a different cross-sectional view of a representative embodiment of the spray nozzle head;

DETAILED DESCRIPTION OF THE INVENTION

Figure 1A:
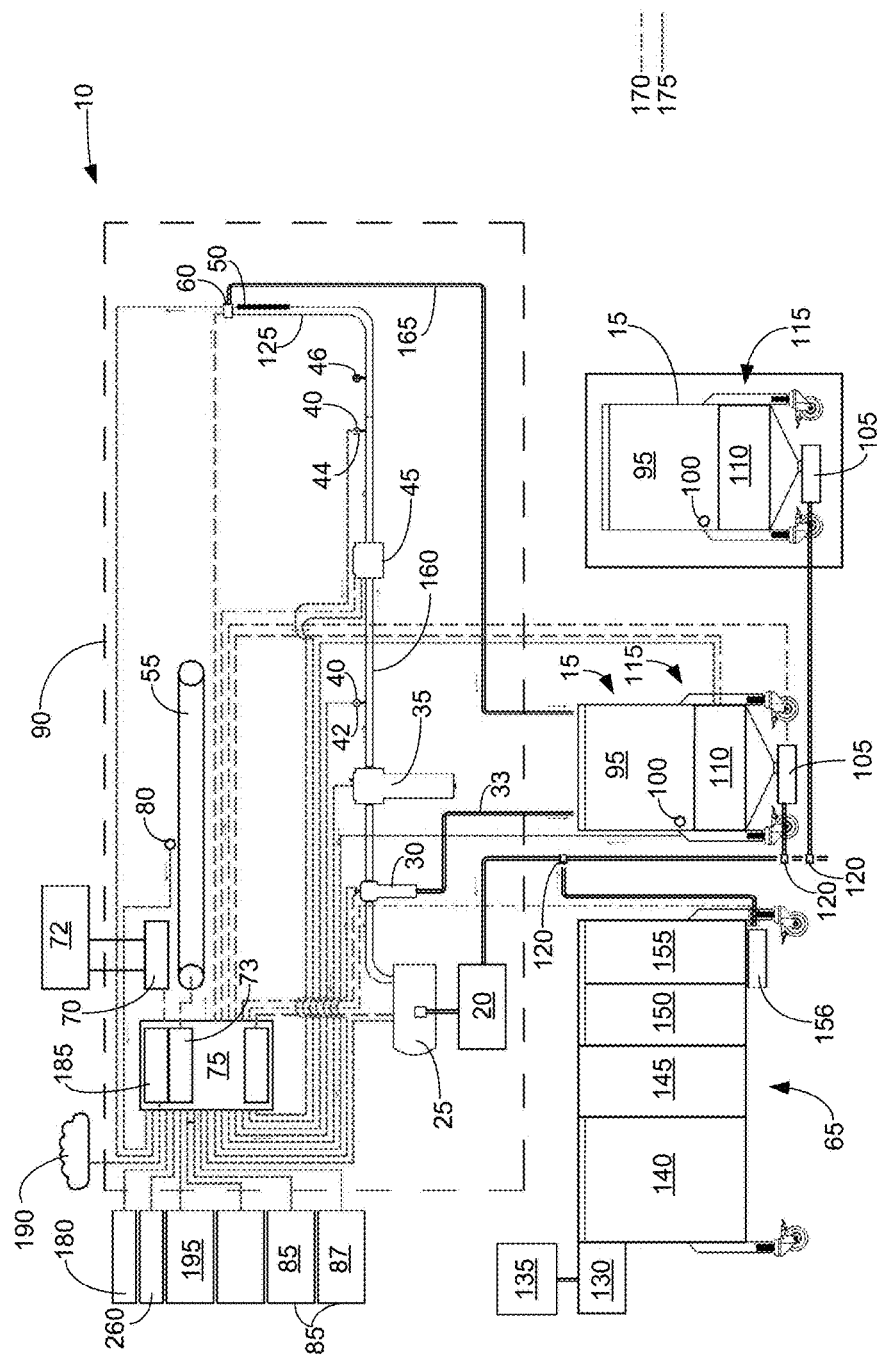
FIG. 1A illustrates a schematic view of a food treatment system in accordance with a representative embodiment of the invention.
Figure 1B:
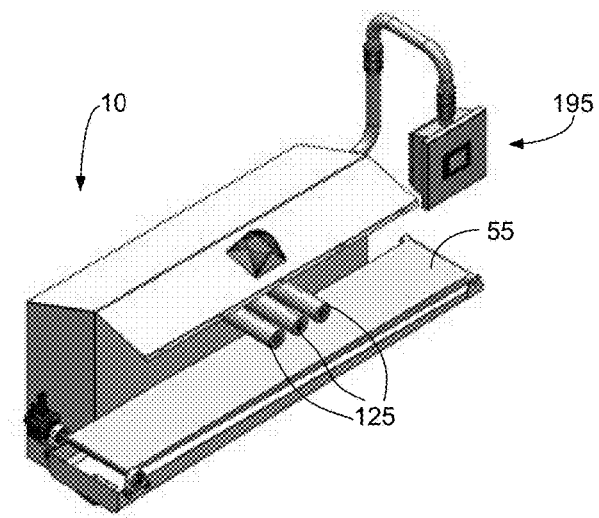
FIG. 1B illustrates perspective view of a representative embodiment of the food treatment system comprising three spray nozzle heads with a food product transport system in a first position in accordance with a representative embodiment.
Figure 1C:
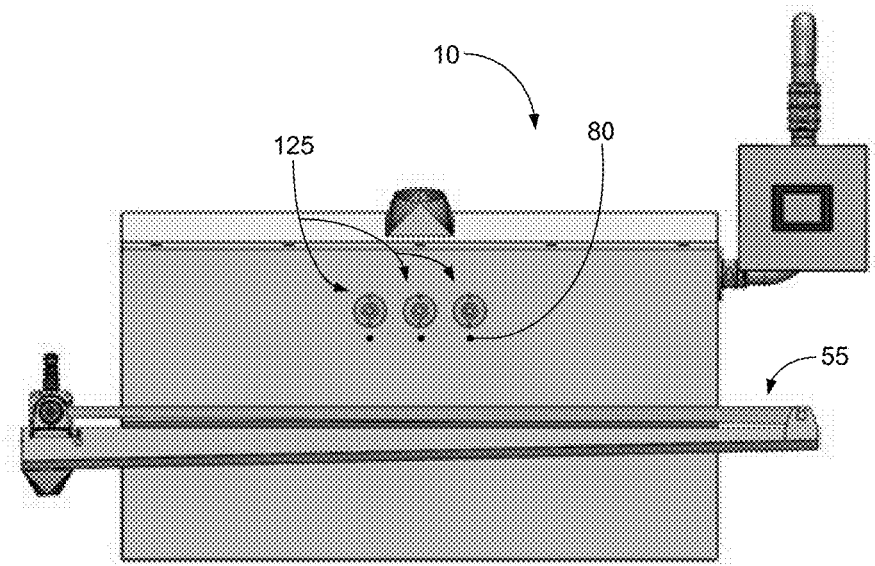
FIG. 1C illustrates front schematic view of a representative embodiment of the food treatment system comprising three nozzle heads with the food transport system in the first position in accordance with a representative embodiment.
Figure 1D:
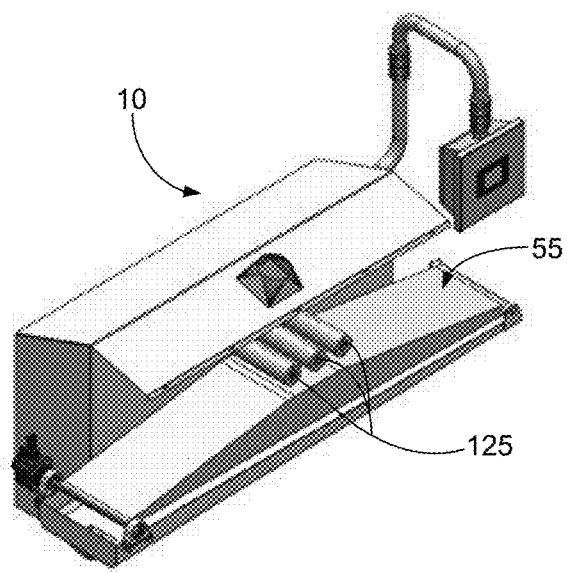
FIG. 1D illustrates perspective view of a representative embodiment of the food treatment system comprising three spray nozzle heads with the food transport system in a second position in accordance with a representative embodiment.
Figure 1E:
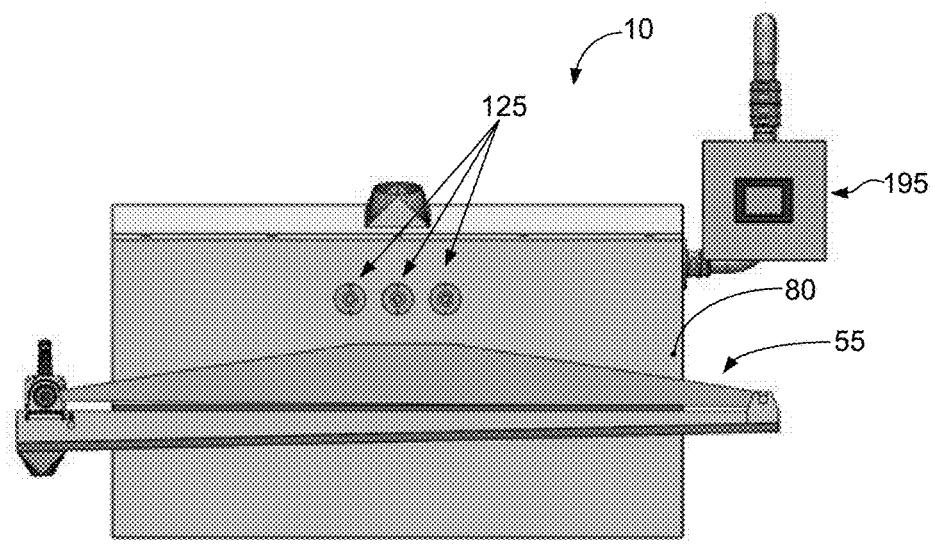
FIG. 1E illustrates front schematic view of a representative embodiment of the food treatment system comprising three nozzle heads with the food transport system in the second position in accordance with a representative embodiment.

The present invention relates to systems and methods for treating food products. More particularly, some implementations relate to systems and methods for injecting (and/or otherwise applying) an injectade to a food product to: tenderize, limit microbial growth in (or provide intervention to), pump up, color, flavor, freeze, chill, preserve, increase a weight of, modify a density of, improve an aesthetic appearance of, change a texture of, change a moisture content, change a nutrient content of, and/or to otherwise treat the food product.

In the disclosure and in the claims, the term food product (and variations thereof) may be used to refer to any suitable food, foods, comestible, comestibles, and/or other edible material (or materials) that can be treated with the described systems and methods. In this regard, some examples of such food products include, but are not limited to, one or more: pieces of an animal (e.g., one or more pieces of meat, fat, flesh, a carcass, tissue, and/or other portions of one or more cows, pigs, lambs, fish, shrimp, lobsters, crustaceans, aquatic animals, deer, elk, rabbits, chickens, turkeys, birds, game animals, and/or any other animal), dairy products, animal products, cheeses, fruits, vegetables, plants, legumes, stalks, leaves, grasses, grains, nuts, seeds, beans, tofu, pieces of fresh food, pieces of frozen good, pieces of raw food, pieces cooked food, pieces of smoked food, pieces of unsmoked food, pieces of cured food, pieces of preserved food, and/or any other edible material that can be treated with the described systems and methods.

As used herein, the terms injectade, solution, and variations thereof, may refer to any suitable material (or materials) that can be applied (interiorly, exteriorly, and/or in any other suitable manner) by the described systems to a food product. In some embodiments, the injectade further comprises any suitable material that can be sprayed from the described systems such that the injectade is injected into (and/or contacted on a surface of and/or otherwise applied to) the food product to: tenderize, decontaminate (or provide intervention to), color, flavor, season, pump up, preserve, improve a palatability of, change a smell of, improve a value of, freeze, chill, change a nutrient content of, change a moisture content of, change a density of, change a texture of, and/or otherwise change one or more characteristics of the food product. Some examples of such injectades include, but are not limited to, one or more: types of water, types of ozonated waters, types of brine, acids (e.g., lactic acids, organic acids, vinegars, and/or any other suitable acids), bases, salts, salt solutions, elements (e.g., liquid nitrogen), compounds, mixtures, enzymes (e.g., Bromelain, Actinidin, Papain, one or more proteases, and/or any other suitable enzymes), coloring agents, disinfectants, stabilizers, food-grade additives, excipients, aromas, preservatives, sugars, gases (e.g., air, oxygen, nitrogen, carbon dioxide, a chemically inert gas, and/or any other suitable gas or gases), and/or any other suitable materials that can be injected into a food product while still allowing the food product to ultimately be eaten. Indeed, in some embodiments, however, the injectade comprises a solution comprising lactic acid.

As used herein, the term tenderize, and variations thereof, may refer to one or more processes in which a portion of a food product is at least partially ruptured, digested, proteolyzed, lysed, pumped up, and/or the food product is otherwise rendered more tender (e.g., less hard and/or tough).

As used herein, the term intervention, and variations thereof, may refer to one or more processes in which a portion of a food product is treated so as to kill, mitigate, deactivate, log reduce, prevent, and/or otherwise reduce an amount (and/or potency) of bacteria, viruses, fungi, protozoa, germs, microbes, parasites, and/or other pathogens that are on an outer surface, an inner surface, and/or any other portion of the food product.

As used herein, the term spray and variations thereof may refer to a process in which injectade and/or any other suitable material is forced through a nozzle. In some cases, the term spray and variations thereof further refers to a process in which injectade and/or any other suitable material is forced through a nozzle such that the injectade pierces, penetrates, impregnates, punctures, showers, sprinkles, drizzles, pours on, jets on, is discharged on, and/or is otherwise applied to, coated on, and/or placed in a food product.

The following disclosure of the present invention is grouped into two subheadings, namely "SYSTEMS AND METHODS FOR FOOD TREATMENT" and "REPRESENTATIVE OPERATING ENVIRONMENT." The utilization of the subheadings is for convenience of the reader only and is not to be construed as being limiting in any sense.

Systems and Methods for Food Treatment

As mentioned, the described systems and methods are configured to inject, apply to one or more surfaces, and/or otherwise apply one or more injectades (or solutions) to a food product to: tenderize, provide intervention to, color, season, freeze, chill, modify a nutrient content of, modify a moisture content of, pump up, modify a temperature of, modify a texture of, and/or to otherwise treat such food product. While the described systems can comprise any suitable component, FIG. 1A shows that, in some embodiments, the described food treatment system 10 includes one or more injectade tanks 15; pre-filters 20; injection pumps 25; pressure regulators 30; bypass lines 33; injectade filters 35; pressure sensors 40; nozzle dwell time valves 45; injection nozzles, pulsation nozzles, spray nozzles, and/or other applicators 50 (wherein such terms may be used interchangeably); food product transports 55; purge valves 60; wash (or clean-in-place) apparatuses 65; demisters 70; computer processing units 75; food product sensors 80; scale systems 85; and/or cabinets 90.

With respect to the injectade tanks 15, an injectade tank can comprise any suitable component or characteristic that allows it to store injectade (not shown) and to allow the system 10 to apply (e.g., inject and/or otherwise apply) the injectade to a food product. Indeed, FIG. 1A shows that, in some embodiments, the tank 15 comprises: one or more injectade reservoirs 95 of any suitable size and shape, high sheer mixers, low sheer mixers, pressure sensors 100 that are configured to determine one or more pressures and/or an amount of injectade within each reservoir, feed pumps 105 that are configured to force injectade from the tank to the injectade pump 25 and to thereby prime and/or reduce the strain on the injectade pump, heating systems that are configured to heat injectade within the tank, and/or cooling systems that are configured to cool injectade within the tank.

With regards to the cooling system 110 (or chiller) of the injectade tank 15, the chiller can comprise any suitable component that allows it to cool injectade within the tank 15. Indeed, in some embodiments, the chiller comprises one or more non-cyclic refrigeration systems, cyclic refrigeration systems, vapor-cycle refrigeration systems, vapor-compression refrigeration systems, vapor-absorption refrigeration systems, gas-cycle refrigeration system, and/or any other suitable cooling mechanism or mechanisms.

In some embodiments, the chiller 110 comprises a glycol chiller. In this regard, while the glycol chiller can be configured in any suitable manner, in some embodiments, the injectade tank 15 comprises a jacketed tank that includes an inner wall that defines at least one reservoir 95 and an outer wall comprising an outer surface of the tank, with cooling coils being disposed between the two walls. In some other embodiments, the described system 10 comprises one or more conduits (e.g., one or more fluid conduits that extend within the system, one or more conduits that extend between the injectade tank and the injection pump 20, etc.) that are lined by, wrapped with, coiled around, and/or otherwise held in proximity with one or more lines carrying a coolant (e.g., glycol, one or more refrigerants, halocarbons, water, and/or other suitable coolants). Accordingly, in some such embodiments, the injectade in the system can be maintained in a desired temperature range, even after the injectade has been removed from the injectade tank.

In some embodiments, the injectade tank 15 further comprises one or more wheels, electrical and/or fluidic coupling devices, and/or any other suitable components that allow the tank to be selectively connected to and/or to be disconnected from the food treatment system 10. Indeed, as shown in FIG. 1A, some embodiments of the tank 15 comprise a movable cart 115. Additionally, FIG. 1A shows that some embodiments of the tank 15 comprise one or more plugs, wires, quick-connect couplers, and/or valves 120 that allow the tank to be quickly connected to the system 10 to allow fluids (e.g., injectade, glycol, and/or any other suitable fluid, signals, reports, data, power, etc.) to flow between the tank and the system. Similarly, in some embodiments, such plugs, wires, quick-connect couplers, and/or valves allow the tank to be detached from the system relatively quickly for any suitable purposes, such as for replacing the tank with another tank (e.g., another tank full of injectade and/or the wash apparatus 65).

In some embodiments (as shown in FIG. 1A), the food treatment system 10 optionally includes one or more pre-filters 20 that are configured to treat the injectade (e.g., to filter the injectade, inactivate pathogens in the injectade, and/or otherwise treat the injectade) and/or to remove particles, debris, and/or other unwanted materials from the injectade prior to allowing the injectade to pass through the injectade pump 25. In such embodiments, the pre-filter can comprise any suitable filter and/or other suitable injectade treatment mechanism, including, without limitation, one or more membrane filters, cartridge filters, canister filters, activated carbon filters, reverse osmosis filters, alkaline filtration systems, water ionizers, UV systems, infrared systems, and/or other suitable filtration systems.

While the pre-filter 20 can comprise any suitable characteristic, in some embodiments, the pre-filter is configured to allow particles smaller than about 200 micrometers, or any suitable size smaller than that (e.g., to allow particles smaller than about 180 micrometers, particles smaller than about 140 micrometers, particles smaller than about 125 micrometers, particles smaller than about 110 micrometers, particles smaller than about 40 micrometers, and/or particles of any other suitable size) to pass through the pre-filter. Indeed, in some embodiments, the pre-filter is configured to allow particles smaller than about 40 micrometers to pass through it.

While the pre-filter 20 can comprise any suitable filter, in some embodiments, it comprises one or more high pressure in-line hydraulic filters, high pressure tee-type hydraulic filters, medium pressure hydraulic filters, membrane filters, ceramic filters, stainless steel element filters, sintered filter elements filters, sintered tin bronze element filters, metal fiber felt element filters, nickel element filters, paper filters, and/or any other suitable filters. Indeed, in some embodiments, the pre-filter comprises one or more high pressure hydraulic filters (e.g., a stainless element high press filter, as produced by NORMAN Filter Company, LLC of Bridgeview, Ill., USA and/or any other suitable entity).

Turning now to the injection pump 25, the system 10 can comprise one or more injection pumps, which (in turn) can each comprise any suitable pump that allows the system to force injectade through one or more nozzles (or applicators)

50 at a pressure sufficient to allow the injectade to penetrate into (or to otherwise be applied to) a food product to tenderize, flavor, provide intervention to, chill, modify a composition of, pump up, and/or to otherwise treat such food product. In this regard, some examples of suitable pumps include, but are not limited to, one or more hydra-cell pumps, positive displacement pumps, hydraulic pumps, continuous flow pumps, roto-dynamic pumps, turbo pumps, reciprocating pumps, centrifugal pumps, booster pumps, canned motor pumps, chopper pumps, circulator pumps, cryogenic pumps, multi-stage pumps, diaphragm pumps, and/or other suitable pumps. Indeed, in some embodiments, the injection pump comprises a positive displacement pump (e.g., a HYDRA-CELL™ seal-less pump, produced by Wanner Engineering, Inc. of MN, and/or any other suitable pump, including from one or more other vendors) that is configured to receive injectade from the injectade tank 15 at a relatively low pressure, and to then force the injectade from the injection pump at a relatively high pressure.

While the injection pump 25 can release the injectade at any suitable pressure, in some embodiments, the injection pump is configured to release the injectade any suitable pressure (depending on the type of food product being treated and the desired treatment being performed) that is less than about 4,000 psi, including at any suitable pressure or sub-range of pressures that are lower than 4,000 psi (e.g., a pressure that is: less than about 2,500 psi, less than about 1,100 psi, less than about 800 psi, less than about 600 psi, less than about 400 psi, and/or any other suitable pressure below about 4,000 psi). For example, in some embodiments, where the food product comprises a seafood (e.g., salmon, shrimp, lobsters, etc.), the injection pump is configured to release injectade from the nozzles 50 at a pressure of between about 700 psi and about 900 psi. Moreover, in some embodiments in which the food product comprises a steak, the injection pump is configured to release injectade from the nozzles 50 at a pressure of between about 900 psi and about 1,450 psi. In some other non-limiting embodiments, where the food product comprises a roast, the injection pump is configured to release injectade from the nozzles 50 at a pressure of between about 2,000 psi and about 4,000 psi.

Additionally, although some embodiments of the injection pump 25 are configured to release injectade at a substantially constant pressure, in some other embodiments, the injection pump is configured to automatically and/or manually vary its pump frequency and/or the pressure at which it releases the injectade. In other words, some embodiments of the injection pump comprise a variable frequency drive pump.

As mentioned, some embodiments of the system 10 optionally comprise one or more pressure regulators 30 that are configured to limit (and/or otherwise control) the pressure of the injectade as it is released to the nozzle 50. In this regard, the pressure regulator can be configured in any suitable manner (including, without limitation, manually and/or automatically) to limit the pressure of the injectade to any suitable level, including, without limitation, by ensuring that the pressure of the injectade that exits the spray nozzle is less than about 4,000 psi (or, as discussed above, any suitable pressure below that). Indeed, in some embodiments, the pressure regulator (and/or the injection pump) ensures that the injectade that is released from the nozzle has a pressure between about 600 psi and about 2,800 psi (or any suitable sub-range thereof). In this regard, in some cases in which the described systems are used with a relatively delicate meat (e.g., salmon and/or another fish) or other relatively delicate food product, the pressure regulator (and/or the injection pump) ensures that the injectade is released from the nozzle at a pressure between about 550 psi and about 1,150 psi. In contrast, in some cases in which the described systems are used with a relatively thick and/or tough meat (or other food product), the pressure regulator (and/or the injection pump) ensures that the injectade is released from the nozzle at a pressure between about 1,150 psi and about 2,600 psi.

With respect now to the bypass line 33, FIG. 1A shows that some embodiments of the system 10 comprise one or more bypass lines 33 that allow injectade to be released from the system when injectade pressure in the system is above a set limit. Indeed, in some instances in which the injection pump 25 is pressurizing injectade and the dwell time valve 45 is closed between sprays of injectade through the nozzles 50, the bypass line prevents undue pressure increases by bleeding some of the injectade out of the system (e.g., into an injectade tank).

Where the system 10 comprises one or more bypass lines 33, the bypass lines 33 can drain injectade from the system 10 into any suitable location, such as into the injectade tank 15 (e.g., for recirculation and/or any other suitable use), a drain, a storage tank, etc. In accordance with some embodiments, however, FIG. 1A shows that the bypass line 33 bleeds injectade back into the injectade tank 15. In some such embodiments, the bypass line comprises one or more nozzles, is angled, is configured to be submersed, and/or is otherwise configured to direct injectade back into the injectade tank in such a manner that injectade within the tank is mixed and prevented from becoming stagnant as injectade is introduced into the tank through the bypass line. In some embodiments, however, the tank comprises one or more high sheer and/or low sheer mixers to mix the injectade (and/or to prevent the injectade from becoming stagnant).

With respect now to the injectade filter 35, the system can comprise one or more injectade filters, which can (in turn) each comprise any suitable filter that is capable of preventing particles and/or other debris in the injectade from passing through the filter and plugging the nozzle. Some non-limiting examples of such filters include one or more high pressure in-line hydraulic filters, high pressure tee-type hydraulic filters, medium pressure hydraulic filters, membrane filters, ceramic filters, stainless steel element filters, sintered filter elements filters, sintered tin bronze element filters, metal fiber felt element filters, nickel element filters, paper filters, and/or any other suitable filters. Indeed in some embodiments, the injectade filter comprises one or more high pressure hydraulic filters (e.g., a stainless steel element high pressure hydraulic filter, as produced by NORMAN Filter Company, LLC of Bridgeview, Ill., USA and/or any other suitable entity).

While the injectade filter 35 can comprise any suitable characteristic, in some embodiments, the filter has a pore size between about 10 and about 120 micrometers, or any suitable sub-range thereof (e.g., between about 65 and about 80 micrometers, between about 70 and about 75 micrometers, between about 15 and about 20 micrometers, and/or any other suitable sub-range). Indeed, in some embodiments, the filter ensures that particles in the injectade that reach the nozzle 50 are at least 90% the size of a spray orifice (or exit aperture) in the nozzle, or smaller (e.g., less than about 76%, less than about 60%, less than 50%, or any suitable amount smaller than a diameter of the orifice). For instance, some embodiments of the injectade filter comprise a pore size that is about 20 micrometers ±5 micrometers, so as to only allow particles smaller than such pore size to pass through the injectade filter.

With respect to the pressure sensors 40, FIG. 1A further shows that some embodiments of the system 10 comprise one or more pressure sensors 40 or transducers. While theses pressure sensors can be disposed in any suitable location (e.g., before and/or after the dwell time valve 45), FIG. 1A shows an embodiment in which a first digital pressure sensor 42 is disposed before the dwell time valve 45, a second digital pressure sensor 44 is disposed after the dwell time valve 45 along with a pressure gauge 46 comprising a display (and/or that is capable of providing pressure readings to the computer processing unit 75). Accordingly, in such an embodiment, the pressure sensors can determine a pressure of the injectade in one or more lines (and/or in the system itself) prior to and after the dwell time valve.

With respect to the nozzle dwell time valve 45, the system can comprise any suitable number of dwell time valves, which, in turn, can each comprise any component or characteristic that allows each valve to open and close to respectively allow and stop the flow of injectade through the nozzles 50. Indeed, in some embodiments, the dwell time valve is configured to open and close to provide timed bursts of injectade through one or more of the nozzles. In this regard, the dwell time valve can be configured to open for any suitable length of time that allows the system to tenderize, provide intervention to, pump up, and/or otherwise treat a food product. Indeed, in some embodiments, the dwell time valve is configured to open and allow injectade to spray from the nozzle for a burst that is any suitable amount of time less than about 30 seconds (including, without limitation, any suitable amount of time less than about 10 seconds). For instance, depending on the characteristics of the food product being treated and the desired treatment, in some embodiments, the valve is configured to allow the nozzle to provide a food product with bursts of injectade that last between about 0.05 and about 8 seconds (e.g., between about 0.2 and about 0.8 seconds or any subrange thereof).

Although in some embodiments, the system 10 is configured such that injectade is sprayed from one or more nozzles 50 when the positions of the food product and the nozzles are substantially static with respect to each other (e.g., the system stops the movement of the food product and/or the nozzle heads 125 while injectade is being sprayed), in some other embodiments, the system 10 is configured to move the food product and/or the nozzles while the injectade is being sprayed. In some such latter embodiments, the system is configured to move the food product with respect to the nozzles (and/or vice versa) in any suitable manner (e.g., in pulses, at any speed, with rest periods (or periods in which a distance between the food product and a nozzle or nozzle head 125 is substantially static) of any suitable time, with continual movement, with continuous movement, and/or in any other suitable manner. Indeed, in some embodiments, the system is configured (e.g., depending on the number of heads in the system, head placement, nozzle placement, desired food product saturation with injectade, and/or any other suitable factor) to use spray dwell time and movement of the food product with respect to the nozzles (or vice versa) to provide a food product with a desired injectade application. Thus, in some embodiments, the system is configured to ensure that an entire food product is treated (e.g., tenderized, pumped up, provided with intervention, flavored, colored, and/or otherwise treated). In some embodiments, the system is further programmable and/or optimizable (e.g., manually, automatically, and/or otherwise, as discussed herein) to ensure that spray dwell time, movement of the food product and/or nozzles, and/or any other suitable parameter of the system is configured to provide a desired treatment.

With respect to the spray nozzles 50, the system 10 can comprise any suitable number of spray nozzles that allow the system to provide a desired food treatment. Indeed, in some embodiments, the system comprises between 1 and 2,000 nozzles, or any sub-range thereof (e.g., between about 1 and about 12, between about 12 and about 64, etc.). The spray nozzles can comprise any suitable characteristic that allows them to treat a food product with injectade. Indeed, although some embodiments of the nozzles are configured to coat a food product with injectade, some other embodiments of the nozzles are configured to spray the injectade at a relatively high pressure (as discussed above) such that a portion of the injectade penetrates to a desired depth into the food product being treated. In such embodiments, each nozzle can comprise any suitable characteristic that allows it to perform such a function. For instance, the nozzles can each define one or more spray orifices of any suitable size. In this regard, some embodiments of the nozzles comprise a spray orifice that is less than about 300 micrometers (or any suitable amount smaller than that) in size. Indeed, in some embodiments, the nozzle's spray orifices are less than about 152 micrometers (e.g., about 145±8 micrometers) in size.

The spray nozzles 50 can further comprise any suitable type of nozzle. In this regard, some examples of suitable nozzles comprise one or more sapphire spray nozzles, stainless steel spray nozzles, diamond spray nozzles, orifices in a pipe, orifices in a tube, orifices in a nozzle head (or support), ports, openings, and/or any other suitable spray nozzle or nozzles. In some embodiments, however, one or more nozzles comprise a sapphire spray nozzle.

While FIG. 1A shows that, in some embodiments, the spray nozzles 50 are disposed on a single spray nozzle head 125 (or support), in some other embodiments, the spray nozzles can be disposed on any other suitable number of spray nozzle heads, including, without limitation, 2, 3, 4, 5, 6, 7, 8, 9, 10, or more.

By way of non-limiting illustration, FIGS. 1B-1E show some embodiments in which the system 10 comprises three nozzle heads 125 (or heads or supports). Where the system 10 comprises more than one nozzle head 125, each head can be fluidly coupled to the system in any suitable manner, including, without limitation, by being connected to the system in series, by being connected to one or more distribution manifolds, by sharing one or more purge valves 60, by comprising its own purge valve, by sharing one or more common drain lines 160, by comprising its own drain line, and/or in any other suitable manner.

Additionally, while FIGS. 1B-1E show that the heads 125 are configured to be disposed above the food product (not shown in FIGS. 1B-1E), the heads can be disposed above, below, on one or more sides of, at one or more angles to, and/or in any other suitable location with respect to the food product. Indeed, in some embodiments, the system comprises at least one spray nozzle head that is disposed above a food product. Moreover, in some other embodiments, the system comprises at least one spray nozzle head that is disposed above a food product and one spray nozzle head that is disposed below the food product (e.g., so as to spray the food product through a wire mesh conveyor belt or otherwise). Furthermore, in some embodiments, one or more nozzle heads are configured to be disposed above a food product at an angle (e.g., so as to not be parallel with a bed of the food product transport 55). In such embodiments, the nozzle head can be disposed at any suitable angle, including, without limitation, an angle between about 0 degrees and about 90 degrees to one side and/or another side of the food product, or any sub-range thereof (e.g., by less than about 30 degrees to one side or another).

Where the system 10 comprises more than one nozzle head 125, the various heads can perform any suitable function that allows the system to function as intended. Indeed, in some embodiments, multiple nozzle heads in the system are configured to spray the same injectate (e.g., at approximately the same time, at approximately the same pressure, at a different time, and/or at a different pressure). Accordingly, in some embodiments, the use of multiple nozzle heads allows the system to apply (e.g., inject) the injectate to a food product more rapidly than could otherwise be achieved with a single head. As a result, in some such embodiments, the system is configured to treat more food product in a shorter period of time than could be achieved with a single nozzle head.

Although in some embodiments, each nozzle head 125 in the system performs the same function (e.g., sprays injectate through its nozzles at the same time, at the same pressure, etc.), in some other embodiments, one or more nozzle heads in the system are configured to perform a different function than another nozzle head of the system. For instance, one nozzle support may be used to: apply (e.g., inject) a different injectate (e.g., a flavoring instead of a tenderizer), apply an injectate at a different pressure, apply a different amount of the injectate, apply injectate through a different size orifice, be at a different distance from the food product, be at a different location with respect to a food product (e.g., be above, below, on an opposite side to, at an angle to, and/or any other orientation), to move at a different time, to move to a different extent, and/or to otherwise perform a different function (and/or function in different manner) than another nozzle head in the system.

Additionally, the spray nozzle heads 125 can comprise any suitable characteristic that allows them to place one or more spray nozzles within a desired distance from a food product. Indeed, in some embodiments, one or more spray nozzle heads is: shaped to substantially match a contour of a food product, selectively re-shapable (e.g., via one or more swivel unions, hoses, connector rings, clamps, adjustable connections, and/or otherwise) to substantially match a contour of the food product), movable (e.g., in shape, in position, manually, automatically, as directed by one or more sensors, to adjust for different food products, and/or otherwise) to help keep the nozzles at one or more desired distances from the food product, and/or is otherwise configured to keep one or more specific nozzles at one or more desired distances from a surface of the food product (e.g., between 0.1 inches and 10 inches from the food product, or any suitable subrange thereof, such as between about 1.5 and about 3.5 inches, depending on the characteristics of the food product and the desired treatment).

The system 10 can further be configured in any suitable manner that allows it to spray injectate into multiple locations on a single food product. Indeed, in some embodiments, the system is configured to move the one or more nozzles 50 (e.g., via one or more nozzle heads 125) with respect to the food product. In some other embodiments, however, the system is configured to move the food product with respect to one or more nozzles (e.g., with respect to one or more heads). In still other embodiments, the system is configured to move both the food product and the nozzles (e.g., the heads) with respect to each other as the system treats the food product.

Where the system 10 is configured to move a food product with respect to the nozzles 50 (e.g., the nozzle heads 125), the system can comprise any suitable components that allow it to accomplish such a function, including, without limitation, one or more conveyor belts (e.g., wire, wire mesh, rubber, plastic, chain, slat, roller, metal, hinge metal, screen cloth, and/or other suitable conveyor belts), roller conveyor systems, augers, servos, food product hanging systems (e.g., rail or otherwise), actuators, motors, moving platforms, and/or other suitable food product transports that are powered in any suitable manner, including, without limitation, via one or more motors, pneumatic actuators, linear actuators, servos, hydraulic actuators, electric actuators, mechanical actuators, air cylinders, and/or other mechanical movement devices. By way of non-limiting illustration, FIG. 1A shows an embodiment in which the food product transport 55 comprises a motor driven conveyor belt (e.g., a wire mesh conveyor belt).

With respect now to the purge valve 60, some embodiments of the system 10 optionally comprise one or more such valves. While such purge valves can perform any suitable function, in some embodiments, they are configured to be manually and/or automatically (e.g., via the computer processing unit and/or otherwise) opened and closed such that air, injectate, and/or other materials can be purged from the system. Indeed, in some embodiments, the purge valves allow air, water, detergents, vinegar, ozone, and/or other cleaning agents to be run through and drained from the system. Additionally, while some embodiments of the purge valve are configured to open and close mechanically, in some other embodiments, the purge valve comprises a valve that is permeable to gases (e.g., air) and impermeable to liquid (e.g., injectate).

With respect now to the wash apparatus 65 (which may also be referred to as a clean-in-place apparatus), in some embodiments, the system 10 comprises one or more wash apparatuses that are configured to provide one or more cleaning agents and/or rinsing agents (e.g., water and/or any other suitable rinse) to the system. In such embodiments, the wash apparatus can comprise any suitable component or characteristic that allows it to rinse and/or otherwise clean one or more components of the system. By way of non-limiting illustration, FIG. 1A shows that, in some embodiments, the wash apparatus 65 comprises one or more water filters 130 (e.g., carbon filters, activated carbon filters, depth filters, screen filters, surface filters, reverse osmosis filters, ceramic filters, membrane filters, deionization filters, distillation filters, ion exchange filters, mechanical filters, ultraviolet filters, water softeners, stainless steel element filters, sintered filter elements filters, sintered tin bronze element filters, metal fiber felt element filters, nickel element filters, paper filters, and/or any other suitable filter that is able to filter undesirable materials from a water source, such as a potable water source 135 (as illustrated in FIG. 1A)); water softeners 140 (e.g., a salt system, ion-exchange polymer system, and/or any other suitable water softening system); reverse osmosis systems 145 (e.g., one or more reverse semipermeable membranes); reservoirs for cleaning materials 150 (e.g., ozone, ozonated water, purified water, one or more soaps, detergents, vinegar, and/or other cleaning agents); reservoirs for rinse water (e.g., purified rinse water) 155; and/or pumps 156 (e.g., low pressure pumps configured to provide fluid from the wash apparatus to the injection pump 25). In some embodiments, the wash apparatus water filters comprise one or more high pressure hydraulic filters (e.g., stainless element high press filters, as produced by NORMAN Filter Company, LLC of Bridgeview, Ill., USA and/or any other suitable entity).

Thus, in some embodiments, after the system 10 has been used (e.g., after a work shift, between the use of different injectades in the system, after servicing the system, before the systems first use, etc.), the wash apparatus 65 is used to clean one or more components of the system (e.g., the pre-filter 20, the injection pump 25, the pressure regulator 30, the injection filter 35, the pressure sensors 40, the dwell time valve 45, the nozzles 50, the nozzle heads 125, one or more conduits 160 that fluidly connect the system's various components, and/or any other suitable portion of the system). In such embodiments, the materials that are used to clean the system can be disposed of in any suitable manner, including, without limitation, by being directed to a drain (e.g., via a drain conduit 165 or otherwise) and/or a storage tank (e.g., the injectade tank 15, a storage tank in the wash apparatus, etc.). In this regard, while the materials that are purged from the system via the purge valves 60 can be directed to an injectade tank, in some embodiments, the system is configured to prevent injectade that has been sprayed from the nozzles 50 from being mixed with (and potentially contaminating) injectade that has not been sprayed from the nozzles (e.g., unused injectade in the tank and/or injectade that returns to the tank via bypass line 33 and/or one or more drain conduits 165).

Turning now to the demister 70, some embodiments of the system 10 optionally comprise one or more demisters 70 that are configured to draw air (e.g., one or more gases) and/or vapor from the system (e.g., the cabinet 90, which is discussed below). In this regard, the demister can perform any suitable function, including, without limitation, destructing ozone; preventing toxic or potentially toxic gases and/or vapors (e.g., ozone, lactic acid vapor, etc.) from flowing out of the system (e.g., cabinet 90) where they could cause harm to an operator and/or other person; preventing cross-contamination; collecting and/or condensing vapors, which may otherwise condense in the system and allow for bacterial breeding and bacterial rain to condense and fall from a surface of the system; removing smoke, steam, evaporated injectade, and/or any other suitable material from air in the cabinet; and/or carrying out any other suitable purpose.

While the demister 70 can comprise any suitable component that allows it to draw air and/or vapor from the system 10, in some embodiments, the demister comprises one or more fans, impellors, suction systems, diffusers, condensers (e.g., condenser 72, as shown in FIG. 1A), moisture eliminators, hoods, collectors, ozone destructors, and/or any other suitable components. In this regard, one example of a demister is the ozone destructor disclosed in U.S. Pat. No. 8,696,796 entitled SYSTEMS AND METHODS FOR REDUCING OFF-GASSED OZONE, and filed Dec. 3, 2012. In another example, while some embodiments of the demister comprise a fan, vacuum, and/or other ventilation device that is disposed between the cabinet 70 and a diffuser, condenser, moisture eliminator, vent, and/or other component configured to remove liquids from air pulled from the cabinet (collectively and individually, a liquid eliminator), in other embodiments, the liquid eliminator is disposed between the cabinet and the fan and/or other ventilation device that is configured to draw air from within the cabinet through the demister. Accordingly, in some embodiments, the liquid eliminator protects the ventilation device from unwanted condensation, contact, and/or contamination with moisture from inside the cabinet.

Turning now to the computer processing unit 75, some embodiments of the system 10 optionally comprise one or more programmable logic controllers and/or other processing units (some embodiments of which are discussed below in more detail). In this regard, the processing unit can perform any suitable function, including, without limitation, providing power to any suitable portion of the system; controlling the pumps (e.g., 25, 105, 156, etc.), the pressure regulators 30, the food product transports 55, the demisters 70, the valves (e.g., 45, 60, 120, etc.), movement of the nozzle heads 125, the wash apparatuses 65, the wash apparatus pump 156, the cooling systems 110, the pressure sensors (e.g., 40, 44, 46, etc.), the sensors 80, the scales 85, and/or any other suitable portions of the system; operating any suitable portion of the system (e.g., as listed above); running diagnostics on one or more portions of the system; adjusting the operating parameters of any suitable portion of the system; optimizing any suitable operating parameters (e.g., injectade temperatures, nozzle spray pressure, nozzle spray time, food product transport speed, load advancement, demister speed, and/or any other suitable parameter) of any suitable portion of the system based on one or more specific characteristics of specific food products, injectades, and/or other desired factors; determining the status of any suitable components of the system (e.g., the tanks 15, the filters (e.g., 20, 35; etc.), the pumps (e.g., 25, 105, 156, etc.), the pressure regulators 30, the food product transports 55, the demisters 70, the valves (e.g., 45, 60, 120, etc.), the nozzle heads 125, the wash apparatuses 65, the wash apparatus pumps 156, the cooling systems 110; the pressure sensors (e.g., 40, 44, 46, etc.), the sensors 80, the scales 85, and/or any other suitable portions of the system; diagnosing errors with one or more components of the system; stopping and/or starting any suitable components of the system; determining when one or more nozzles 50 are partially and/or completely occluded; moving the nozzles and/or nozzle heads; moving the food treatment transport; determining the amount of injectade that has passed through one or more nozzle heads; determining the amount of injectade that has been injected into one or more specific food products; controlling UV lights and/or system decontaminating apparatus; determining whether the food product transport is jammed and/or gummed up; reporting on the status of any suitable components of the system; trouble shooting errors with the system; controlling system cleaning; controlling nozzle cleaning; and/or otherwise monitoring and governing any suitable components and/or parameters of the system.

In some additional non-limiting examples of suitable functions of the processing unit 75, some embodiments of the processing unit: determine pressures within the injectade tank 15; determine injectade levels within the injectade tank; determine and controls the temperature of injectade within the injectade tank; power on and off and/or varies a speed and pressure produced by one or more pumps and/or otherwise controls a fluid pressure provided by such (e.g., pumps 25, 105, and/or 156); adjust a pressure limit on the pressure restrictor 30; determines a cleanliness of the injectade filter 35; determine an amount of fluid that has passed through the filters (e.g., 130, 20, 35, etc.); open and close and determine a status of the dwell time valve 45; determine the pressures measured by the various pressure sensors (e.g., 40, 42, 44, 46, etc.); control a speed at which, a status of, and when the food product transport (and/or food product transport driver 73) moves and stops; determine a status of and opens and closes the purge valve 60; move the food product to a desired location with respect to the nozzles 50 (e.g., via the food product transport 55 and/or otherwise);

move one or more of the nozzles to a desired location with respect to the food product; determine a status of and turns on and off and otherwise controls the demister 70, including one or more individual components thereof; control network communications (as discussed below); control a user interface (as discussed below); control and receive information from the scale system 85; respond to one or more emergency stop switches (e.g., switches 180, shown in FIG. 1A); and/or perform any other functions that allow the processing unit to control, monitor, troubleshoot, record data from, communicated data, and/or otherwise govern the food treatment system 10.

By way of non-limiting illustration, FIG. 1A shows that, in some embodiments, power and/or signal output are provided (as illustrated by lines 170) from the processing unit 75 to various components of the system 10 and signal input (as shown by lines 175) is provided from some such components (e.g., the injectade tank pumps 105, the pressure sensors 100 in the injectade tanks 15, the injection pumps 25, the pressure regulators 30, the injectade filters 35, the pressure sensors 40, the dwell time valves 45, the purge valves 60, the food product transports 55, the wash apparatus pumps 156, the demisters 70, the food product sensors 80, valves 120, the scale systems 85, and/or any other suitable components) back to the processing unit.

In some embodiments (as mentioned), the processing unit 75 gathers information (e.g., from one or more scales, probes (as discussed below), users, tests, sensors, gauges, safety sensors, and/or any other suitable sources) and uses such information to optimize and/or control the system 10 (e.g., via a continuous feedback loop and/or otherwise). While such information can be used to optimize the system in any suitable manner, in some embodiments, such information is used to optimize (e.g., automatically, to notify a user to optimize, and/or to otherwise optimize): injectade recipes, injectade spray time, injectade pressure, injectade temperature, the amount of injectade that is applied to food products, injectade spray depth, how far a food product moves between injectade applications, distances between food products and one or more nozzles 50, distances between food products on the food product transport 55, timing of cleaning cycles, length of cleaning cycles, cleaning pressures, nozzle head rotation, cleaning cycle parameters, UV light use parameters, and/or any other suitable characteristic or parameter of the system and its method of functioning. Thus, in some embodiments, as the system functions and gathers data, the system is able to use such data to automatically (and/or as directed by a user) improve the functioning of the system (e.g., to produce better food product, to waste less food product, to waste less injectade, etc.).

In some embodiments, the processing unit 75 is in communication with a modem (e.g., modem 185) and/or another suitable network interface (as described below in more detail). In such embodiments, this network interface can perform any suitable function, including, without limitation, connecting the described system 10 to a server comprising software to run the system; recording and monitoring information regarding the use of the system; allowing programs and applications to be added to, deleted from, updated on, and/or to otherwise be modified on the system; allowing information from one or more systems to be gathered; allowing for the system to be controlled, troubleshot, and/or monitored remotely; and/or allowing the system and its components to be remotely monitored, adjusted, updated, diagnosed, fixed, actuated, deactivated, and/or otherwise controlled. Indeed, in some embodiments, the system is configured such that it will not tenderize, provide intervention to, pump up, and/or otherwise treat a food product unless the system is properly connected to a network (e.g., cloud 190). Accordingly, in some embodiments, an administrator can ensure that the system is not used without permission, can monitor system use, can charge royalties based on use (and/or any other factor), and/or can otherwise monitor and control the system.

In some embodiments (as mentioned), the processing unit 75 is further connected to a user interface and/or another input and/or output device 195 (a touchscreen or other device, as discussed below, and as illustrated in FIG. 1A). In this regard, the input/output device can serve any suitable function, including, without limitation, providing a user with an interface for operating, determining the status of, adjusting, controlling, diagnosing, and/or otherwise observing and governing the function of the system 10.

Figure 1F:
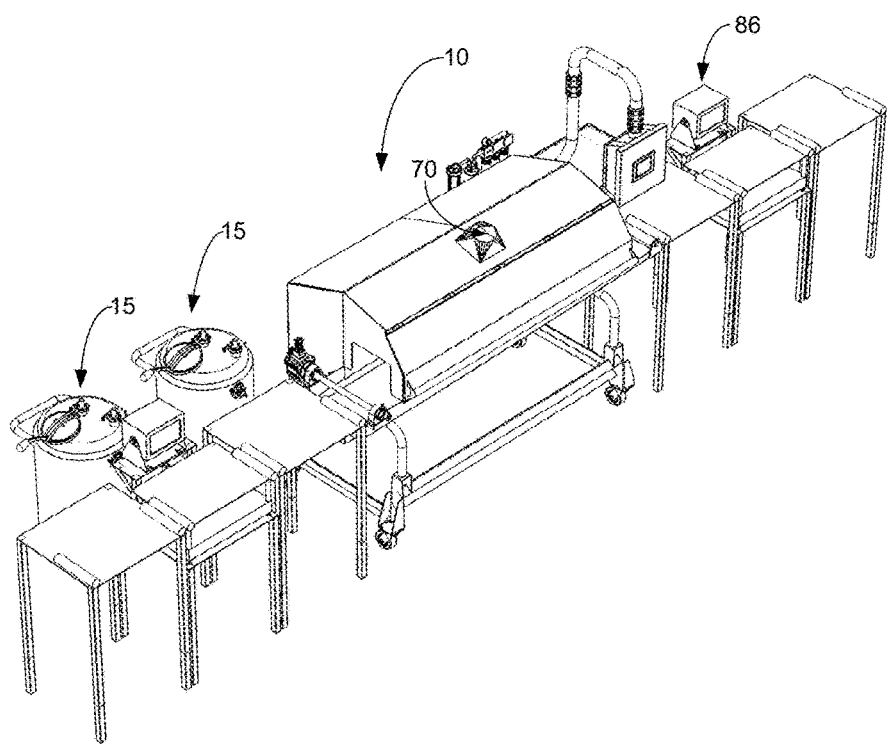
FIG. 1F illustrates a perspective view of a representative embodiment of the food treatment system.
Figure 1G:
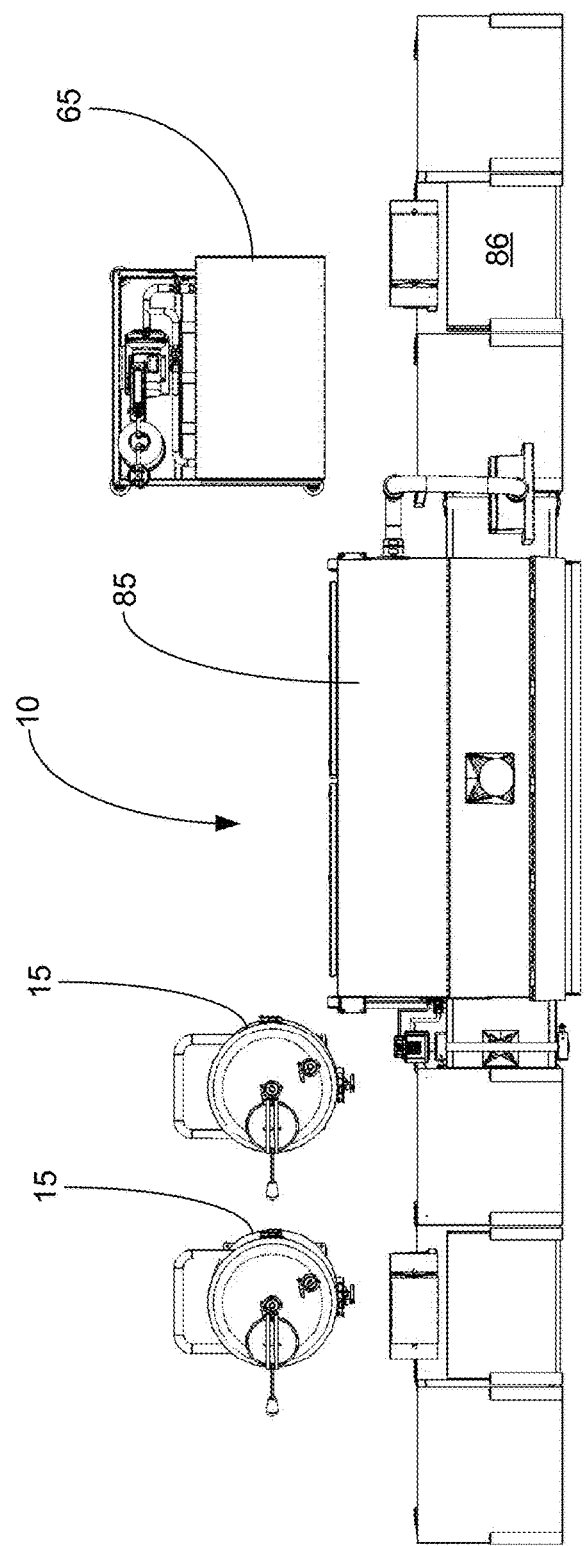
FIG. 1G illustrates a top view of a representative embodiment of the food treatment system.
Figure 1H:
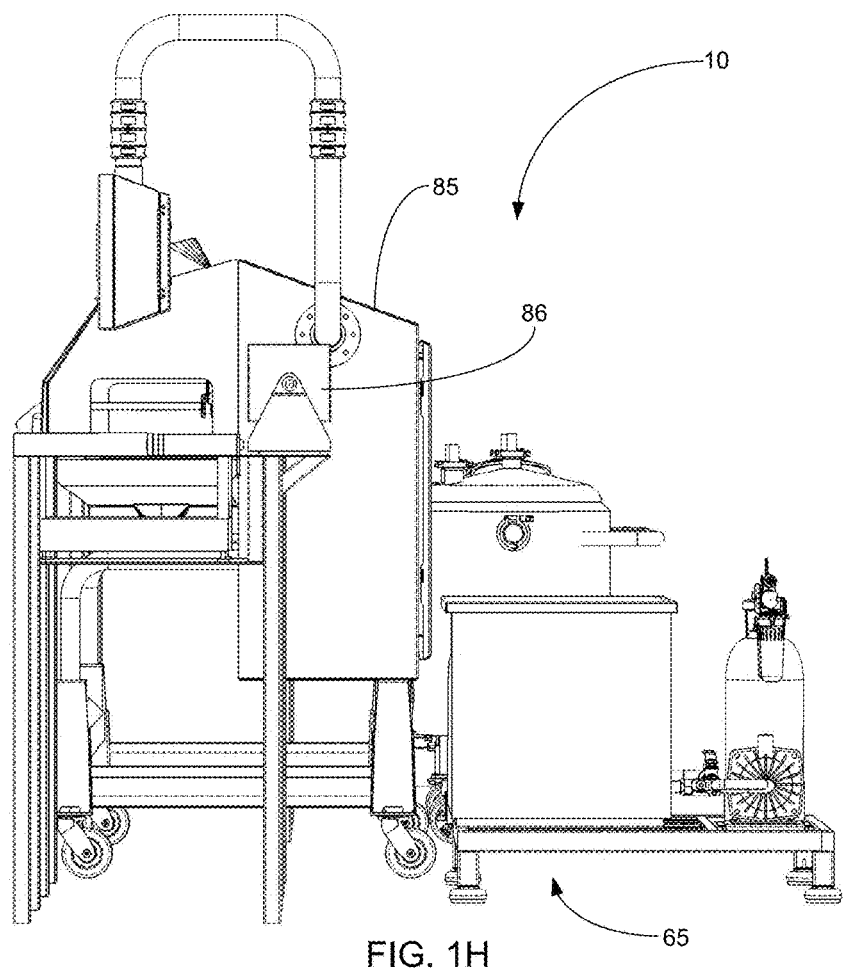
FIG. 1H illustrates a side view of a representative embodiment of the food treatment system.

In some embodiments, the system further comprises one or more scale systems 85. In this regard, the scale systems can comprise any suitable component that allows the system 10 to determine how much injectade has been added into one or more food products by the system and/or any other suitable information (e.g., how much of the injectade that is sprayed is not retained by a food product, etc.). By way of non-limiting illustration, FIG. 1A (and FIGS. 1F-1H) show that, in some embodiments, the scale system 85 comprises an in motion scale (and/or other suitable scale) having both an "in" scale 86 and an "out" scale 87, with the in scale being disposed prior to the spray nozzles 50 and the out scale being disposed after the spray nozzles.

In some embodiments in which the system 10 comprises an in 86 and an out 87 scale, the scale system 85 can measure how much injectade has been received by any suitable number of food products. In one example, the scale system 85 determines a weight of one food product before being injected with injectade and then determines the weight of that same food product after it has been injected to determine how much injectade has remained within the food product. In another example, however, the scale system is configured to measure the weight of multiple food products that enter and leave the system over a period of time (e.g., per minute, per hour, etc.). In this example, the system 10 can determine an average amount of injectade that is retained within the food products that pass through the system. Moreover, in accordance with some embodiments, if the processing unit 75 (and/or a user/administrator) determines that more or less injectade should be applied to the food product, the processing unit automatically records such data, notifies a user and/or administrator, and/or changes the system's operating parameters (e.g., "on the fly". As directed by the user/administrator, or otherwise) to ensure that a desired amount of injectade is applied to and/or within the food product and/or to further optimize the system's operations.

Figure 2A:
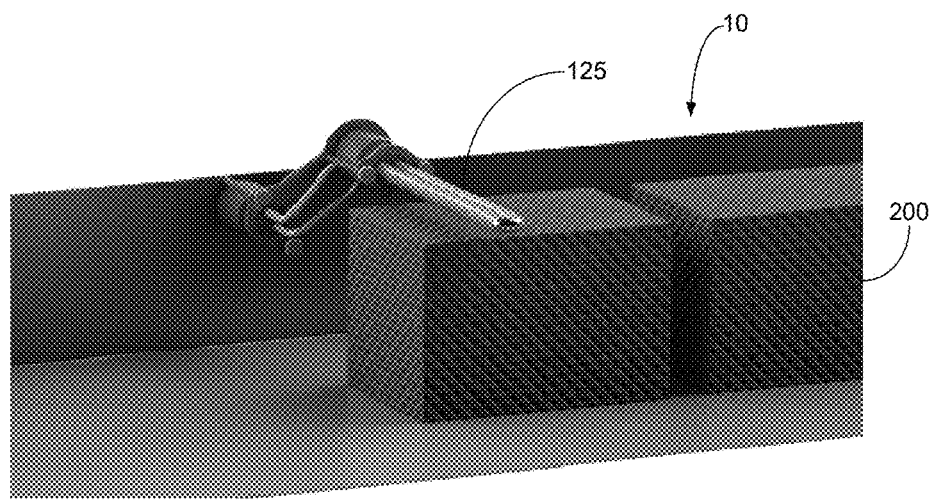
FIGS. 2A-2B each illustrate a perspective view of a spray nozzle head in accordance with a representative embodiment of the food treatment system.
Figure 2B:
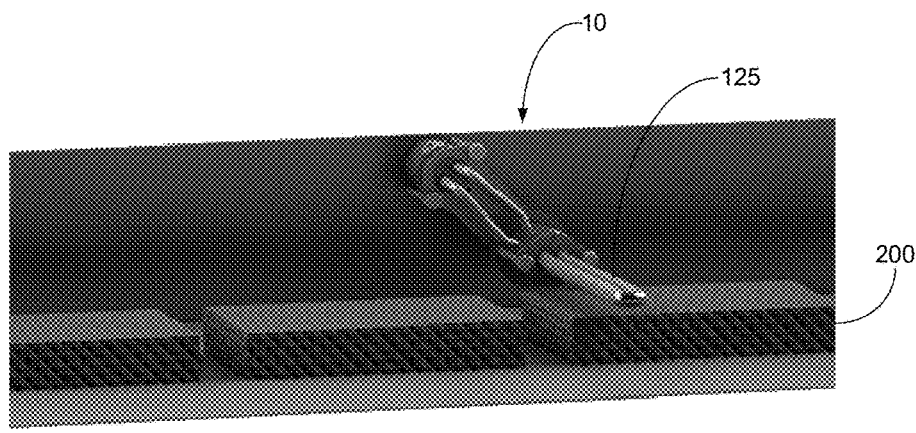
Figure 2C:
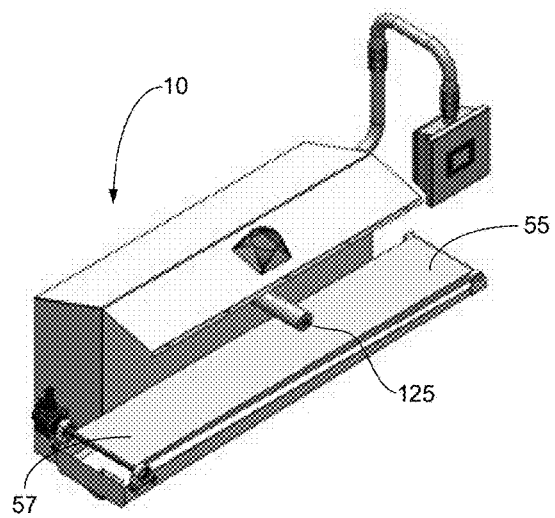
FIG. 2C illustrates perspective view of a representative embodiment of the food treatment system with the food transport system in the first position in accordance with a representative embodiment.
Figure 2D:
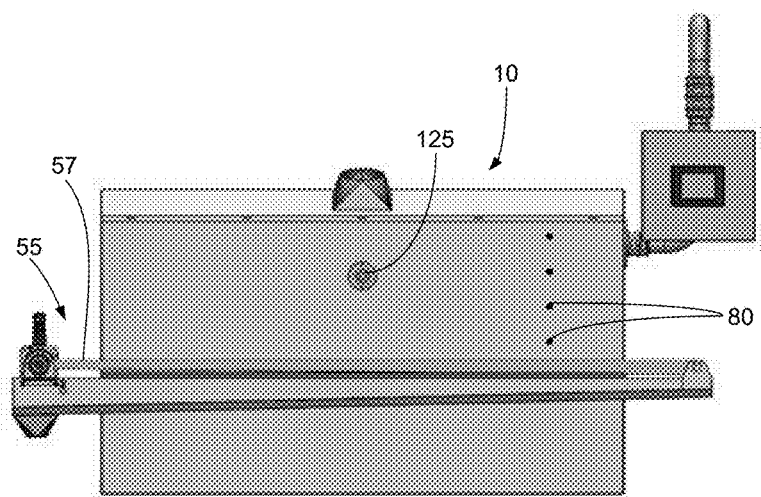
FIG. 2D illustrates front schematic view of a representative embodiment of the food treatment system with the food transport system in the first position in accordance with a representative embodiment.
Figure 2E:
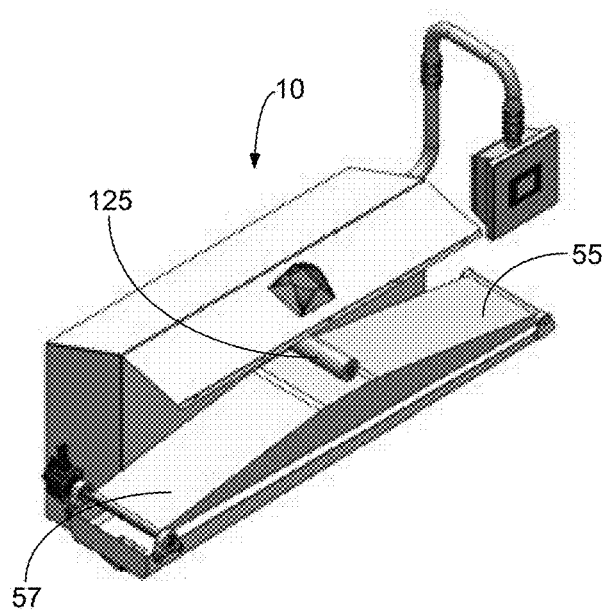
FIG. 2E illustrates perspective view of a representative embodiment of the food treatment system with the food transport system in the second position in accordance with a representative embodiment.
Figure 2F:
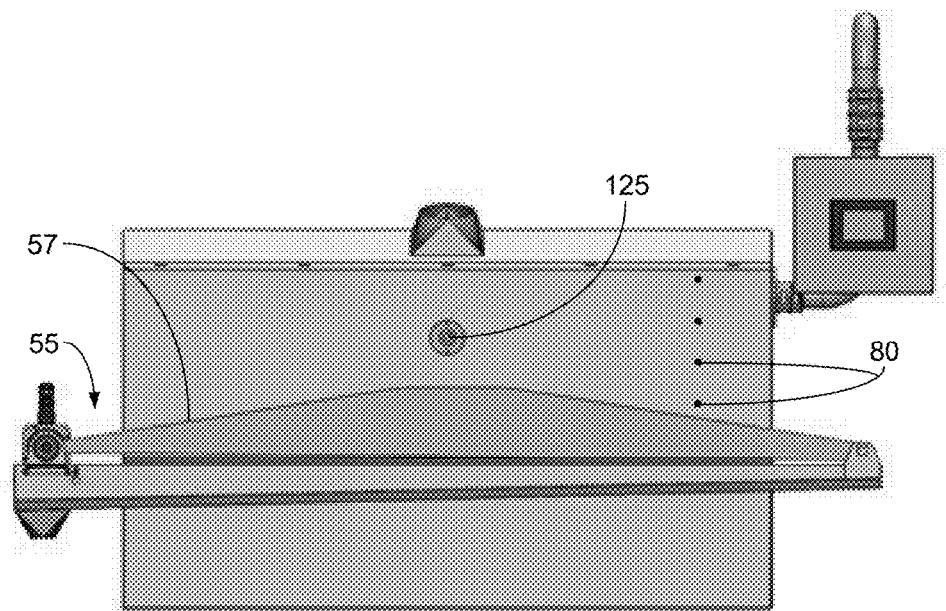
FIG. 2F illustrates front schematic view of a representative embodiment of the food treatment system with the food transport system in the second position in accordance with a representative embodiment.

With regards to the food product sensors 80, some embodiments of the system 10 optionally comprise one or more food product sensors 80 (e.g., as shown in FIG. 1A) that are configured to determine a size, height, width, length, shape, contour, position, mass, and/or other characteristic of a food product passing through the system. While the system can comprise any suitable type of sensors (e.g., one or more types of sonar, electronic eyes, light beam sensors, laser sensors, photoelectric sensors, tactile sensors, cameras, motion detectors, proximity sensors, infrared sensors, photodetectors, fiber-optic sensors, safety sensors, and/or any other suitable sensor), in some embodiments, the sensors comprise one or more electric eyes.

Where the system 10 comprises one or more food product sensors 80, the sensors can perform any suitable function. Indeed, in some embodiments, the sensors determine when a food product is passing in proximity to the nozzles 50 (thus indicating when the system should inject injectade). In some other embodiments, the system comprises one or more sensors that detect a food product before it reaches the nozzles 50, thus, allowing the nozzles to begin spraying (e.g., and/or purging air in the nozzle head 125) before and/or as the food product comes into proximity with the nozzles. In still other embodiments, the sensors further determine the proximity of a food product to the nozzles (e.g., the nozzle heads 125), thus allowing the system to automatically change the distance between the nozzles and the food product. By way of non-limiting illustration, FIGS. 2A-2B show that in some embodiments, the system 10 is configured to move the spray nozzle head 125 (e.g., via one or more motors, pneumatic actuators, linear actuators, servos, hydraulic actuators, electric actuators, mechanical actuators, and/or other suitable mechanical movement devices) to be a desired distance (e.g., between about 0.1 and about 10 inches, or any sub-range thereof) from a surface of the food product 200. Indeed, in some embodiments, the system is configured to maintain one or more spray nozzles within a distance between about 0.2 inches and about 0.8 inches from a surface of a food product that is being treated. In this regard, in some embodiments, the sensors 80 allow the spray nozzle head to be substantially maintained at a desired distance from a food product by adjusting to the various contours of a specific food product.

In another example (e.g., as illustrated in FIGS. 2C-2F), the system 10 is configured to move a portion of the food product closer to and/or further from the nozzles 50. While this can be accomplished in any suitable manner, in some embodiments, as one or more food product sensors 80 determine a size, contour, and/or other characteristic of one or more specific food products, the system (e.g., the processing unit 75) causes the food product transport 55 to move the food product closer to and/or farther from one or more nozzle heads 125 (e.g., by moving a portion of the transport closer to the head via the use of one or more motors, pneumatic actuators, linear actuators, servos, hydraulic actuators, electric actuators, mechanical actuators, air cylinders, pulley systems, rail systems, and/or other mechanical movement devices). Indeed, as shown in FIGS. 2C-2F, in some embodiments, a portion of a conveyor belt 57 is configured to be raised and/or lowered to maintain the food product (not shown in FIGS. 2C-2F) at a desired distance from the nozzle heads 125 (e.g., by raising a portion of a carry way that supports the conveyor belt, allowing end rollers of the conveyor belt to come closer together and/or further apart, and/or in any other suitable manner).

Thus, in some embodiments, the system 10 is configured to move the food product to maintain the food product at a desired distance (e.g., between about 0.1 and about 10 inches, or any sub-range thereof) from one or more nozzles 50. Indeed, in some embodiments, the system is configured to maintain the food product within a distance between about 0.2 inches and about 0.8 inches (or any sub-range thereof) from a nozzle. In this regard, the sensors 80, in some embodiments of the system, allow the food product to be substantially maintained at a desired distance from one or more spray nozzles by adjusting a portion of the transport to move the food product based on the various contours of the food product.

Figure 3:
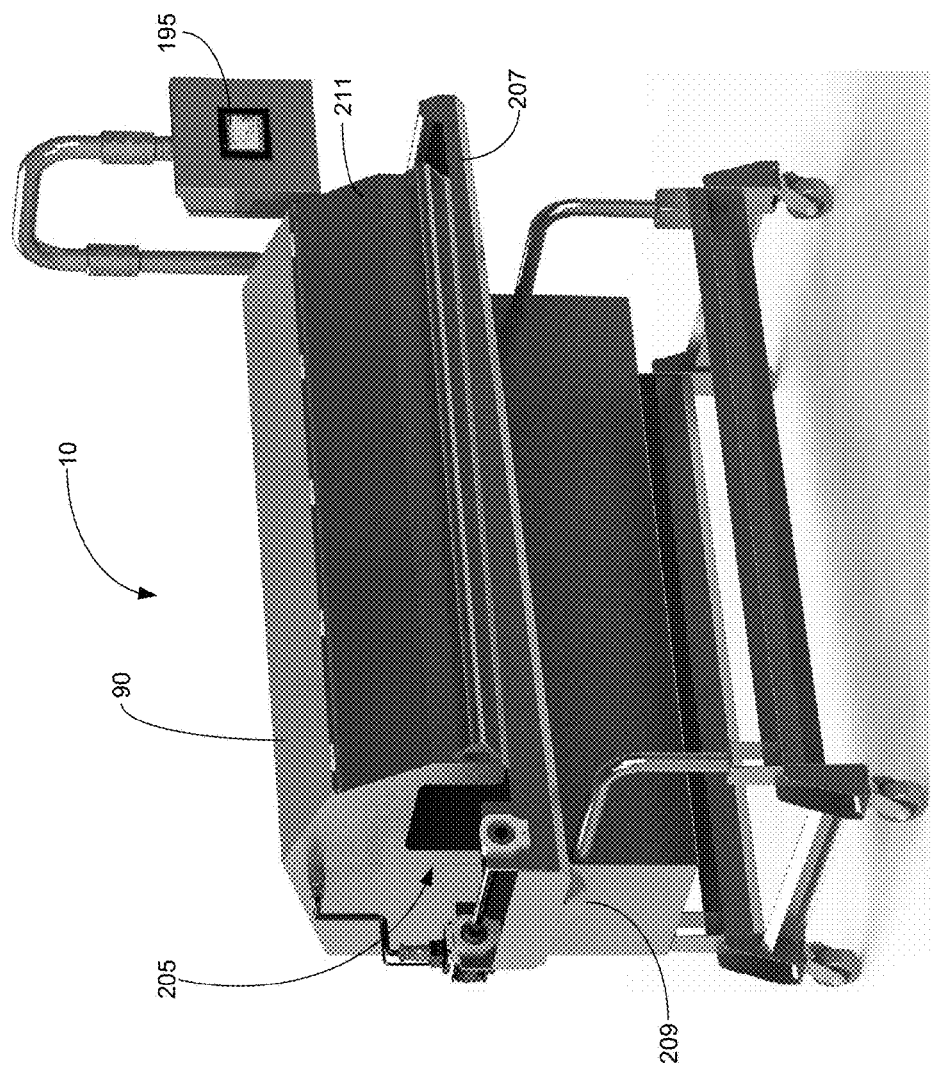
FIGS. 3-4 each illustrate a perspective view of the food treatment system in accordance with a representative embodiment of the invention.
Figure 4:
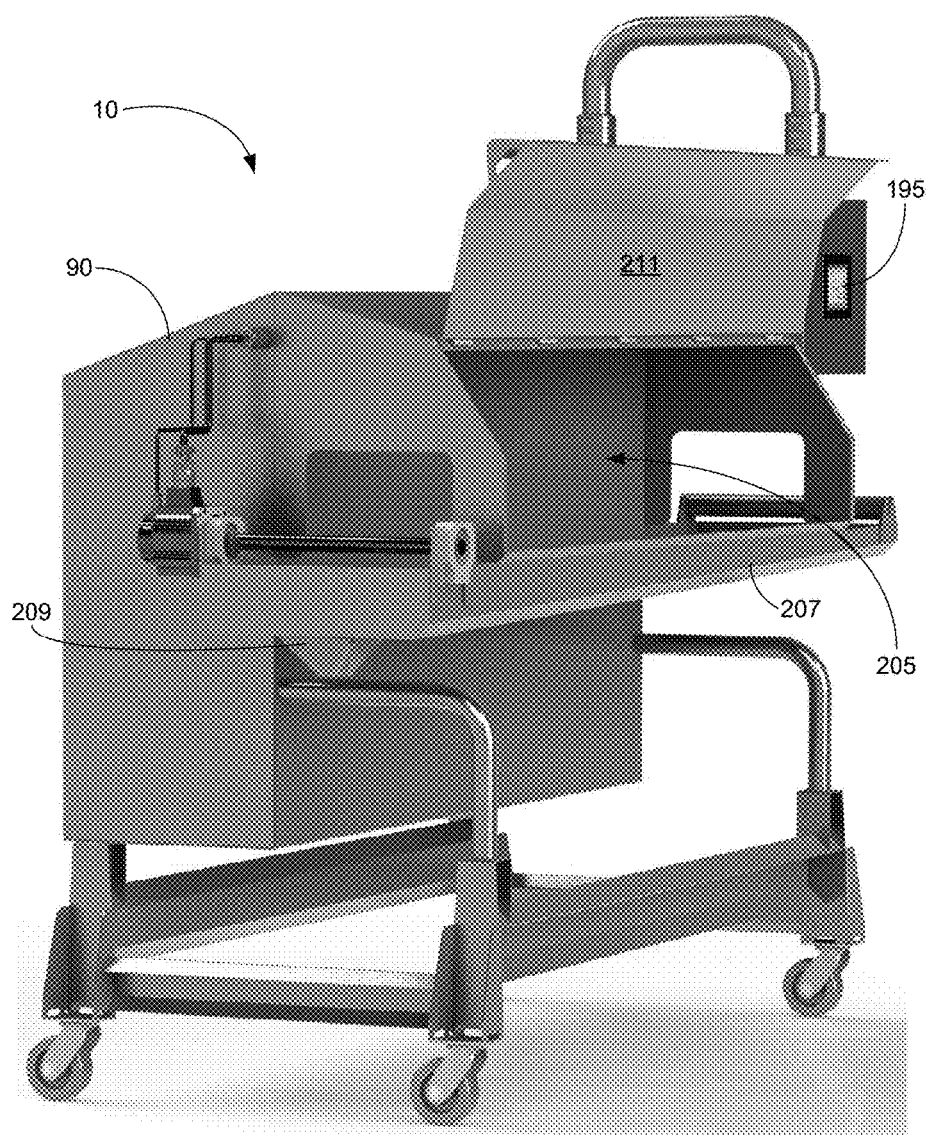

Turning now to the cabinet 90, some embodiments (and as illustrated in FIGS. 3-8) of the system 10 comprise one or more cabinets 90 that are configured to house one or more components of the system. In this regard, the cabinet can have any suitable feature. For example, FIGS. 3-4 show that, in accordance with some embodiments, the cabinet 90 comprises a chamber 205 that is configured to house the spray nozzles 50 (not shown in either of FIGS. 3-4) and to contain the food product (not shown in either of FIGS. 3-4) as it is treated. In such embodiments, the cabinet can perform any suitable function, including, without limiting, directing vapors and gases to the demister 70, preventing a user from being exposed to undesirable amounts of injectade spray and/or off-gassing, and/or any other suitable purpose.

In another example, one or more internal surfaces of the cabinet 90 are configured to direct condensation in the cabinet to a desired location (e.g., a drain, a storage container, etc.). By way of non-limiting illustration, FIG. 4 shows that, in some embodiments, a lower tray 207 and/or lid 211 of the cabinet 90 is sloped and/or otherwise configured to direct excess injectade, blood, food-product drippage, etc.) to a drain 209. Accordingly, in some such embodiments, the cabinet may prevent (and/or reduce an amount of) condensation that forms in the cabinet from dripping on a food product disposed therein. While such a function can be accomplished in any suitable manner, in some embodiments, one or more surfaces of a lid of the cabinet are sloped at an angle that allows condensation that forms on such lid to be directed away from food products within the cabinet.

Figure 5:
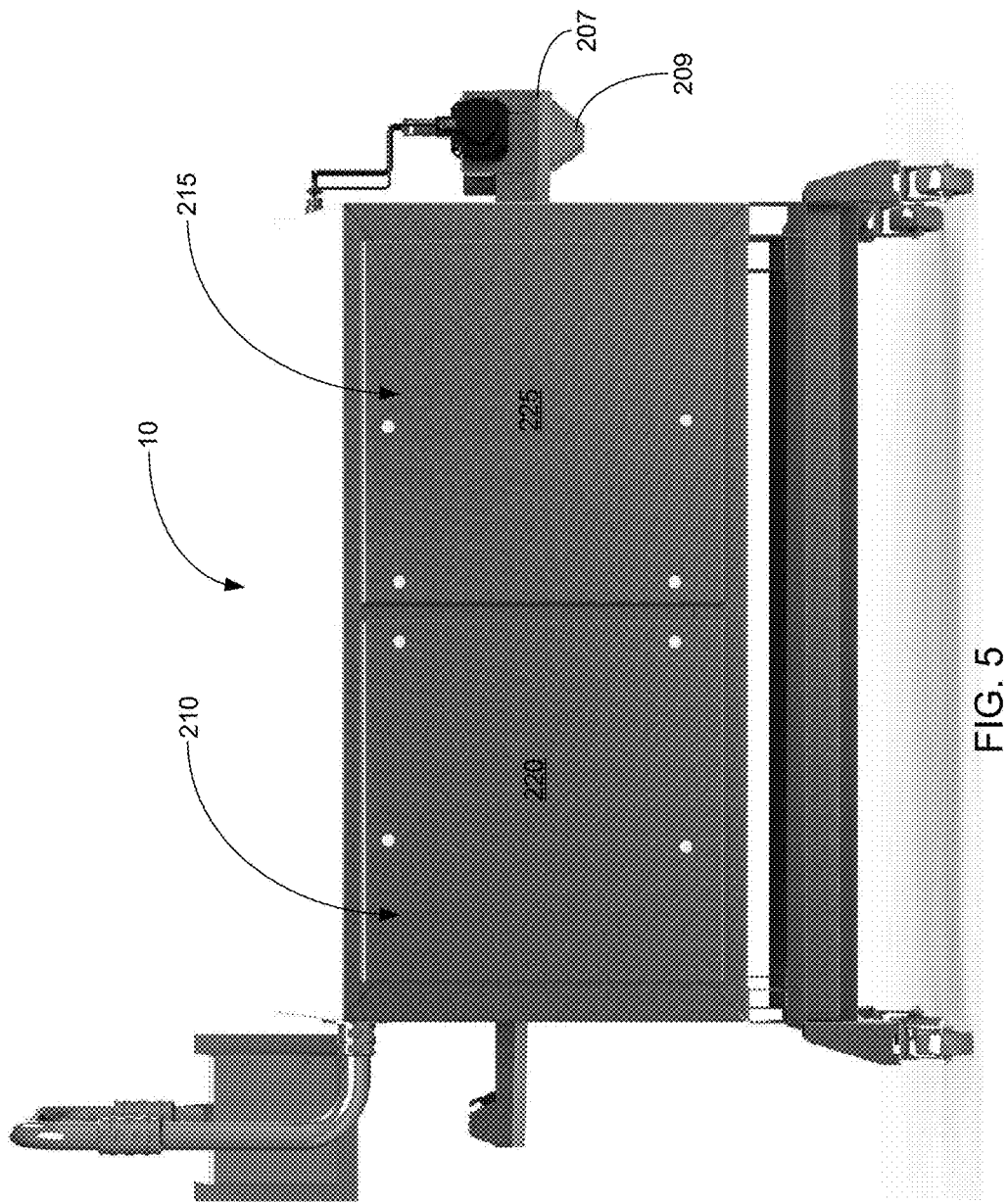
FIG. 5 illustrates a back side view of a representative embodiment of the food treatment system.
Figure 6:
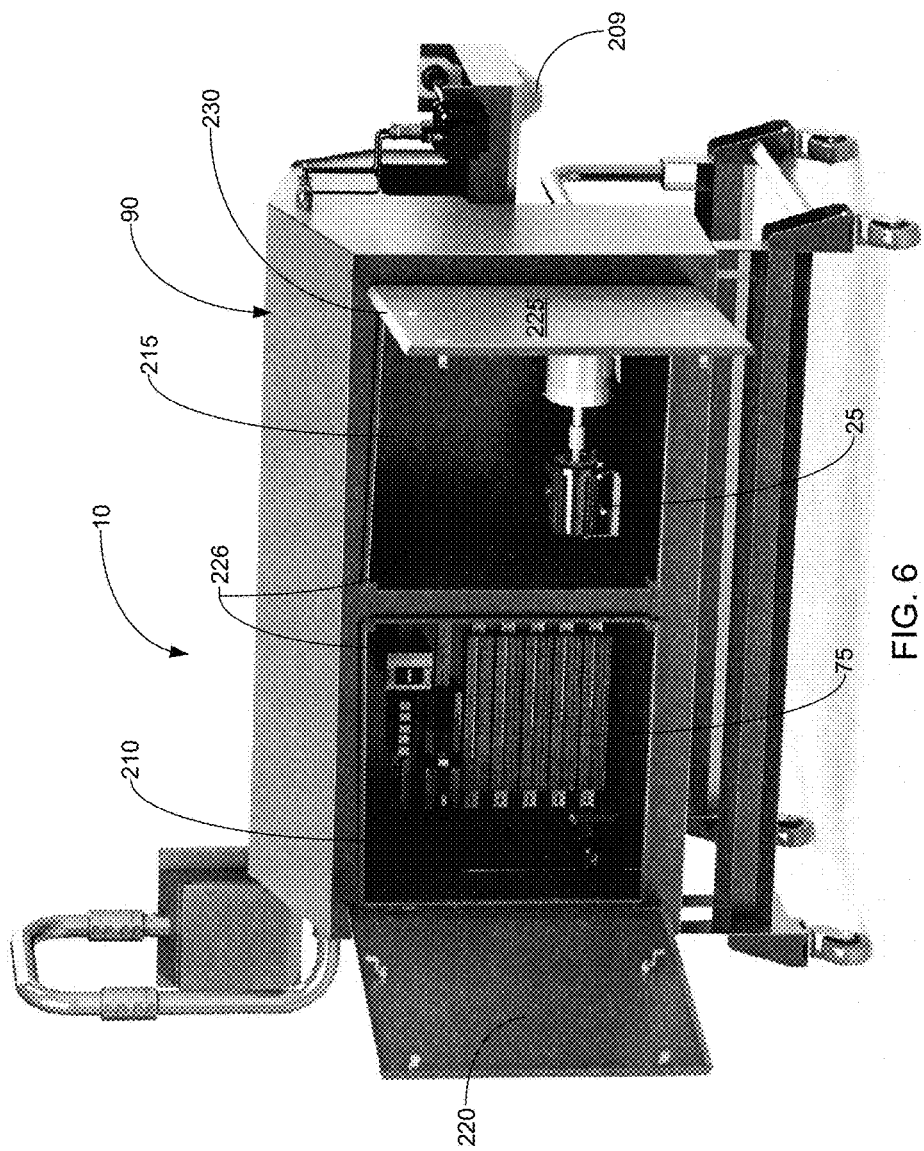
FIG. 6 illustrates a back side perspective view of a back side of a representative embodiment of the food treatment system.
Figure 7:
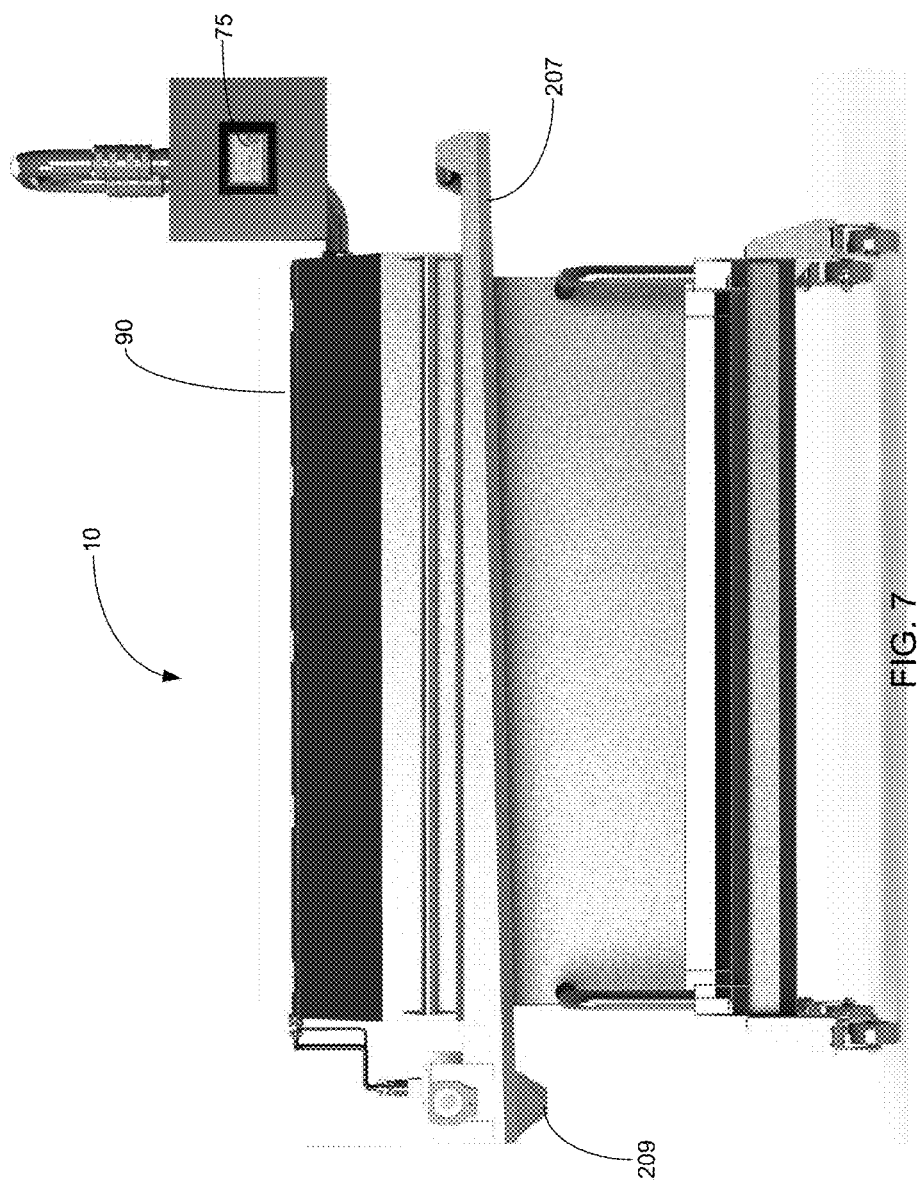
FIG. 7 illustrates a front view of a representative embodiment of the food treatment system.
Figure 8:
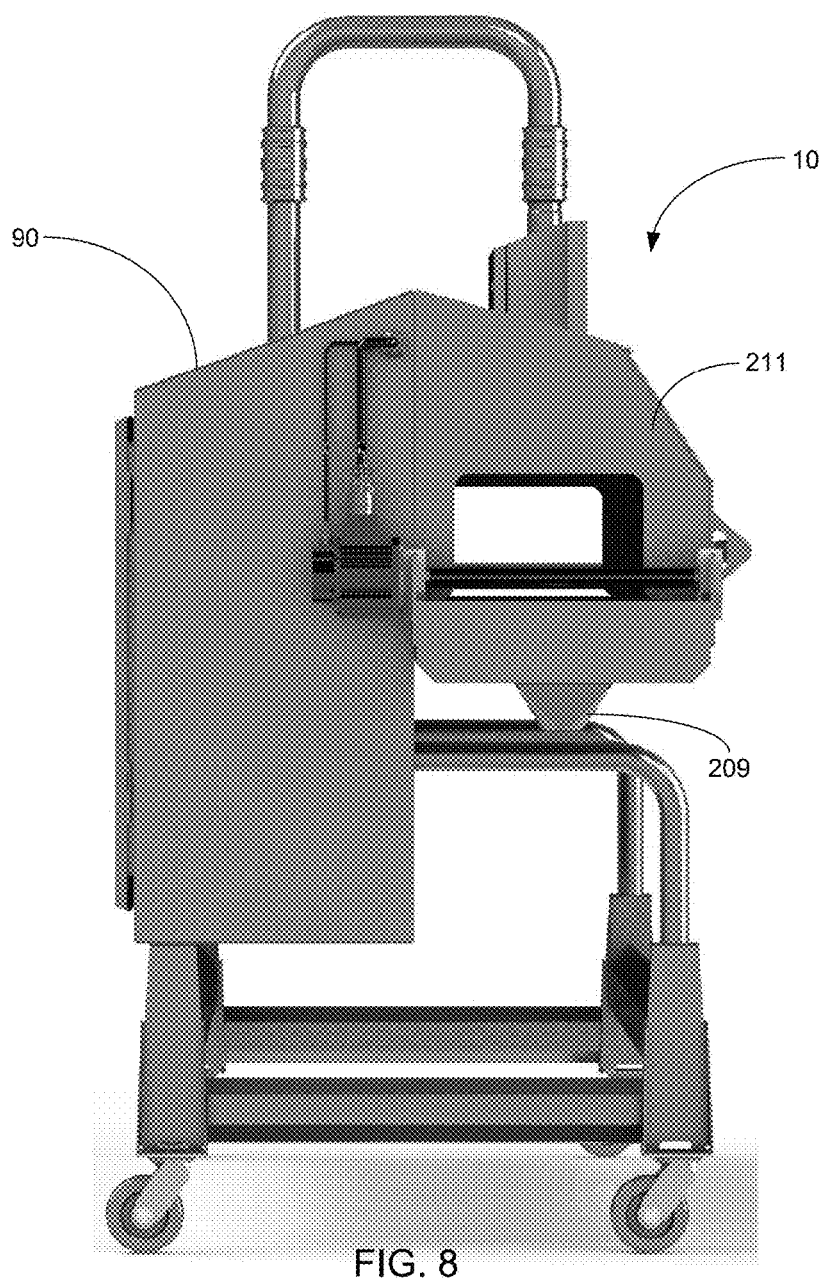
FIG. 8 illustrates a side view of a representative embodiment of the food treatment system.

In another example, FIGS. 5-6 show that, in some embodiments, the cabinet 90 comprises one or more separate compartments (e.g., compartments 210 and 215). While these two compartments can perform any suitable function, in some embodiments, one compartment 210 comprises some electronic components of the system (e.g., the processing unit 75), while the other compartment 215 comprises the injection pump 25 and/or any other components that may potentially be exposed to leaks of injectade and/or other liquids that pass through the system 10.

Where the cabinet 90 comprises one or more compartments (e.g., compartments 210 and 215), the compartments can comprise any suitable feature. In this regard, some embodiments of the cabinet comprise one or more doors with one or more seals. By way of non-limiting illustration, FIG. 6 shows an embodiment in which the cabinet 90 comprises two doors 220 and 225 comprising a seal and/or lip 226 that extends exteriorly, and wherein a portion of the edging 230 around the door is configured to slope away from the opening of the corresponding compartment to help direct any liquids that fall or condense on such edging away from such compartment.

In addition to the aforementioned features, the described food treatment system 10 can be modified in any suitable manner that allows it to treat a food product. In one example, the system comprises one or more UV lights that are configured to kill, disable, log reduce, and/or otherwise reduce microbes in any suitable portion of the system 10. Accordingly, in some embodiments, such lights are used to keep one or more portions of the food treatment system and/or a food product that is treated thereby, sanitary.

In another example, the described system 10 is configured to provide multiple injectades (e.g., one or more tenderizers, coloring agents, flavoring agents, etc.) to a food product passing there through. While this can be accomplished in any suitable manner, in some embodiments, the system comprises two more separate injectade tanks 15 and two or more separate pumps (e.g., pump 25), injection filters 35, and/or spray nozzle heads 125 that are each configured to independently deliver a different injectade to one or more food products.

In still another example, some embodiments of the system 10 are configured to apply one or more injectades to a food product in more than one manner. In this example, the injectade(s) can be applied to the food product via one or more external application techniques (e.g., spraying, misting, soaking, pouring, an injectade curtain, and/or any other suitable method); internal injection techniques (e.g., injection techniques using needles and/or other objects that penetrate the food product); injection techniques in which no nozzles, needles, and/or other objects penetrate the food product to inject the injectade, and/or any other suitable injection technique; and/or any other suitable methods. Indeed, in some embodiments, an injectade (or solution) is applied to an outer surface of a food product (e.g., as a decontaminant, colorant, seasoning, etc.) and one or more injectades are injected at a high pressure to one or more depths into the food product, without a nozzle, needle, and/or other object penetrating the food product to inject the injectade.

Figure 9:
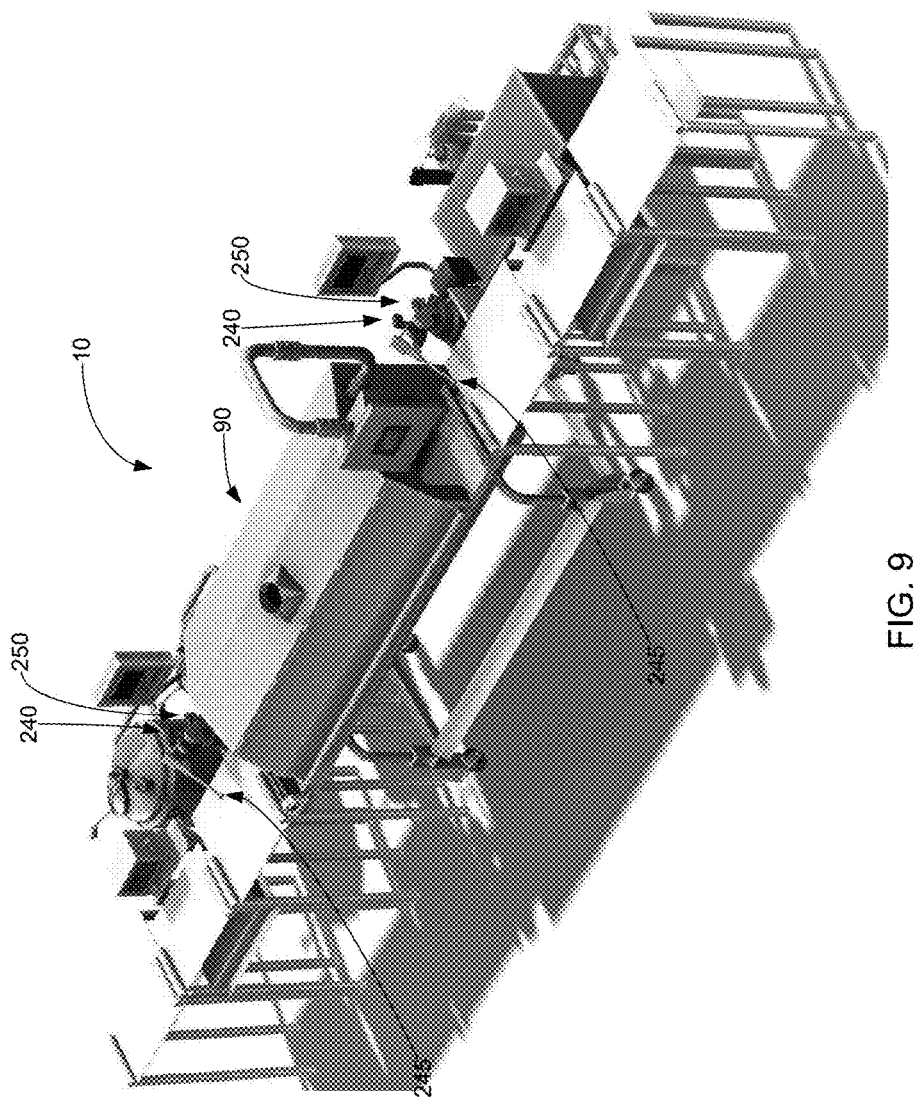
FIGS. 9-14 each illustrate a different view of the food treatment system in accordance with some embodiments of the system.
Figure 10:
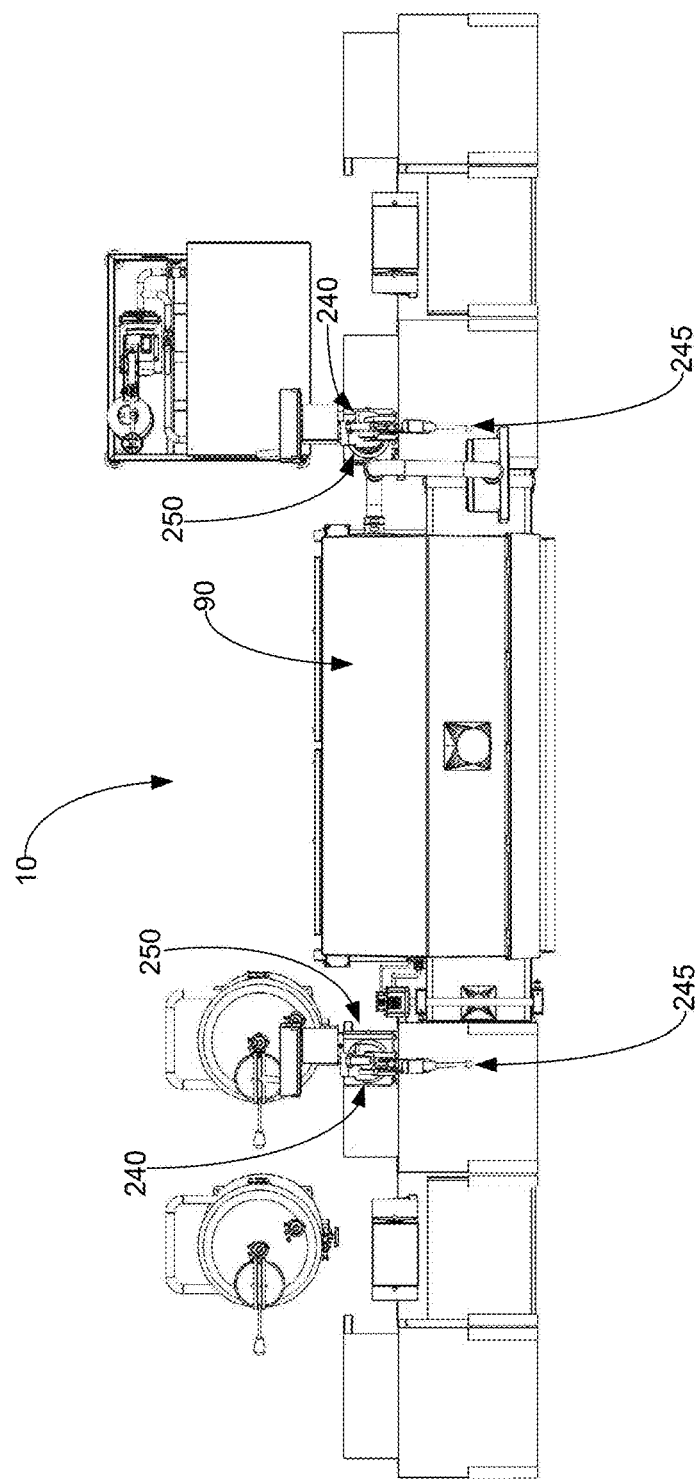
Figure 11:
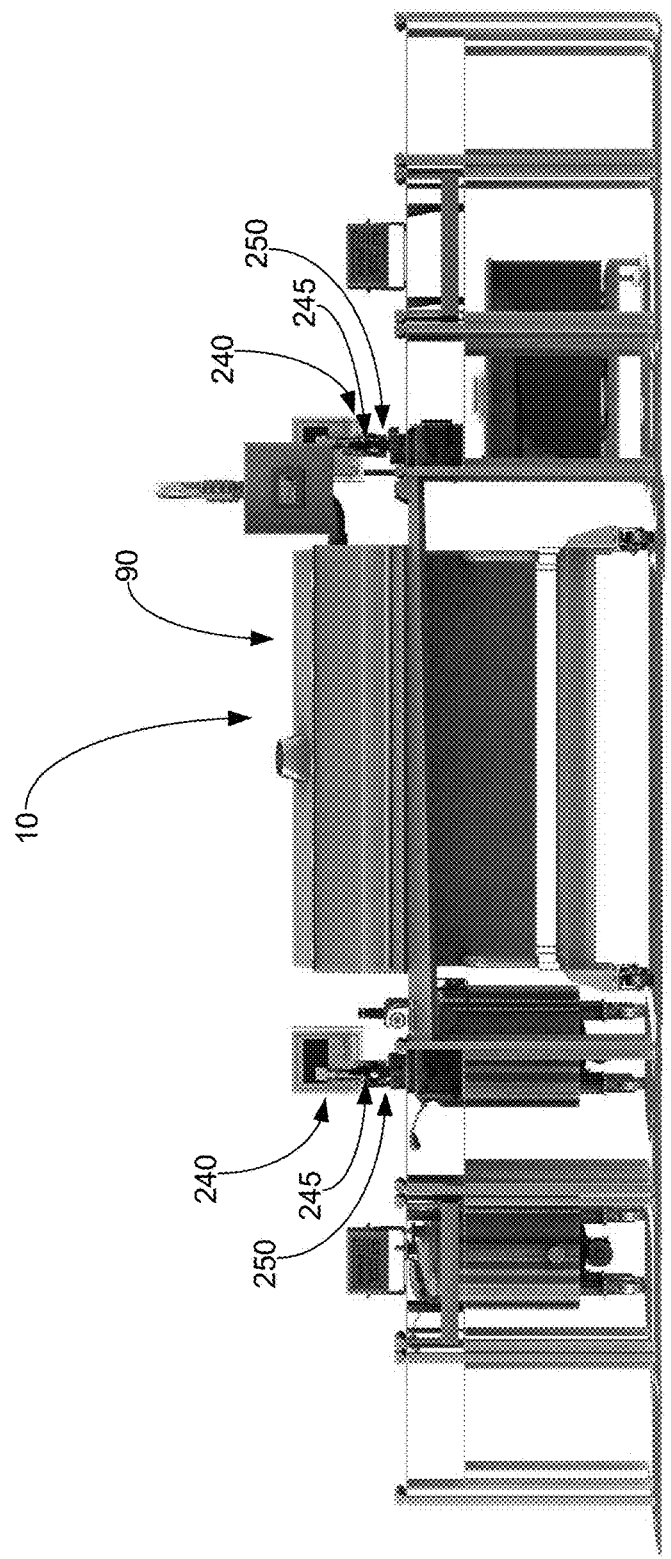
Figure 12:
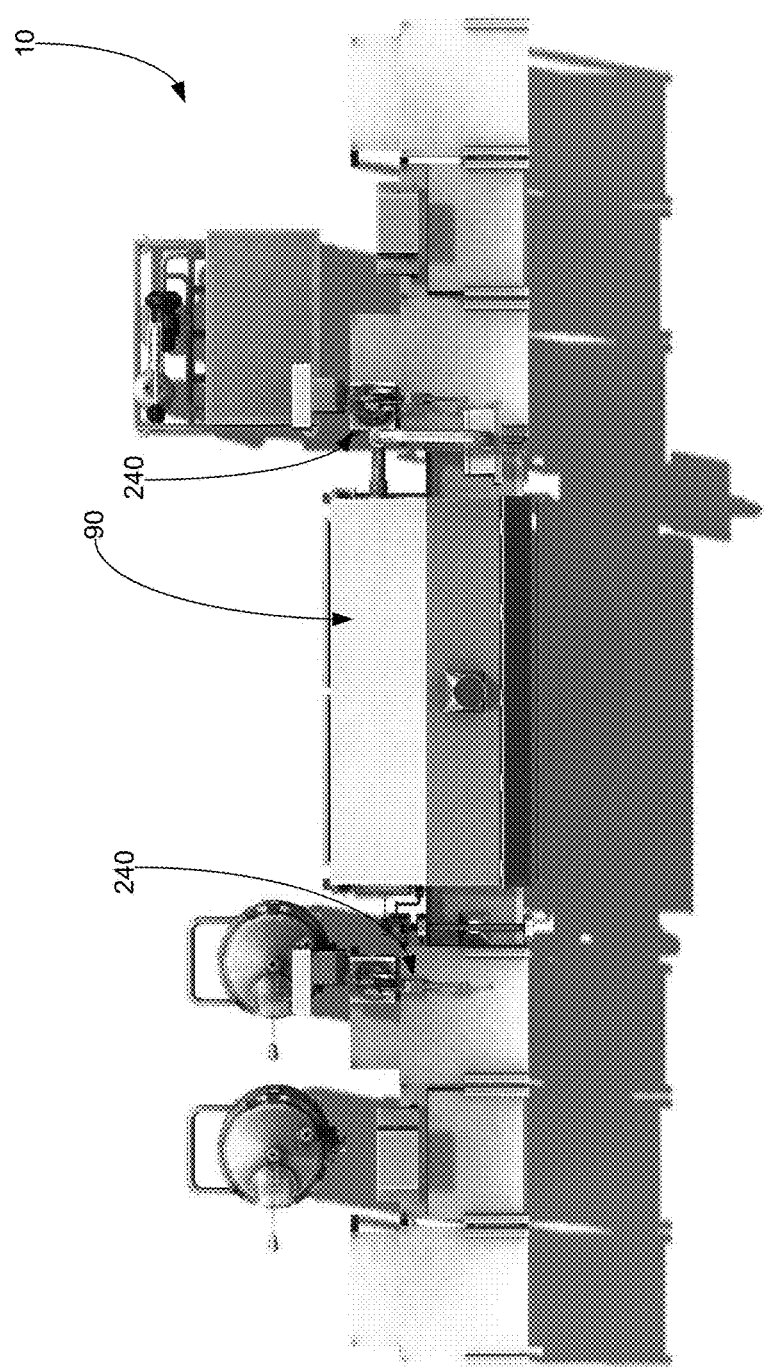
Figure 13:
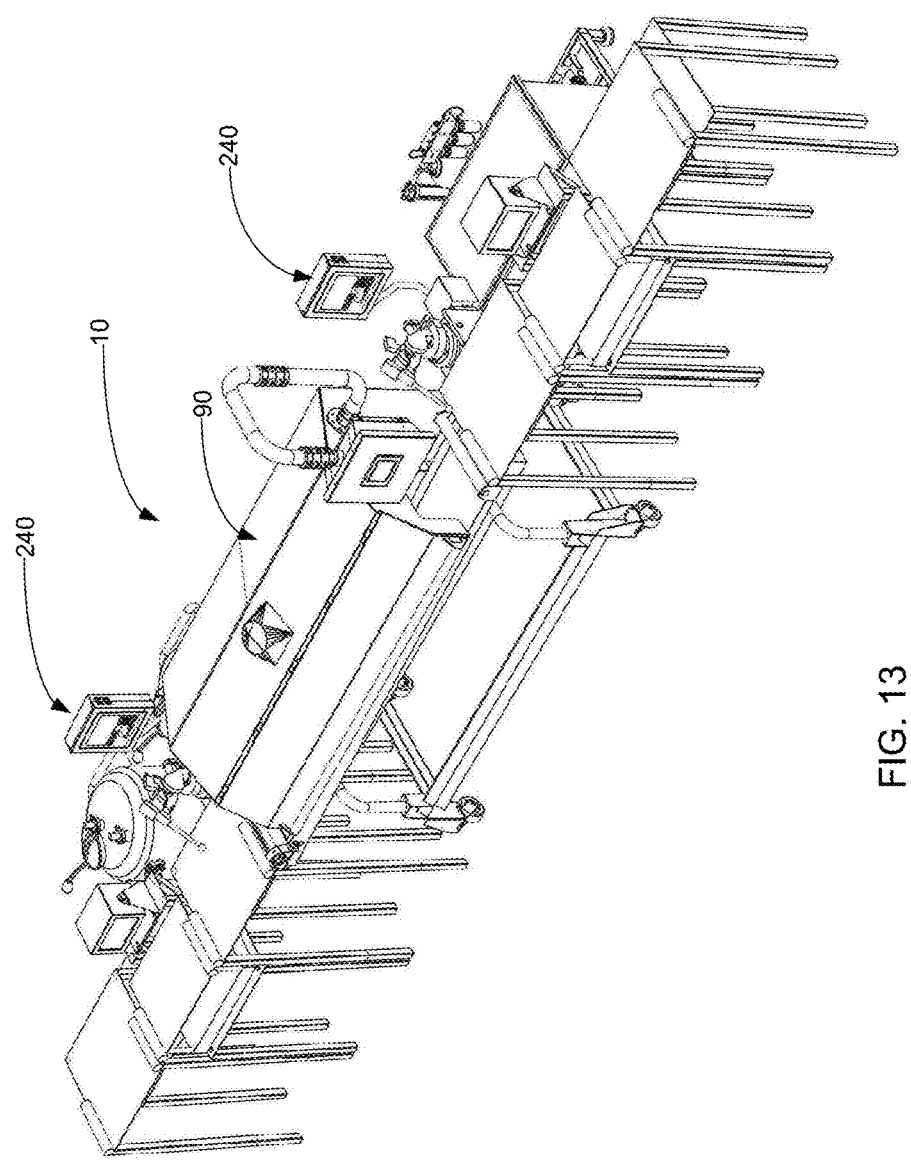
Figure 14:
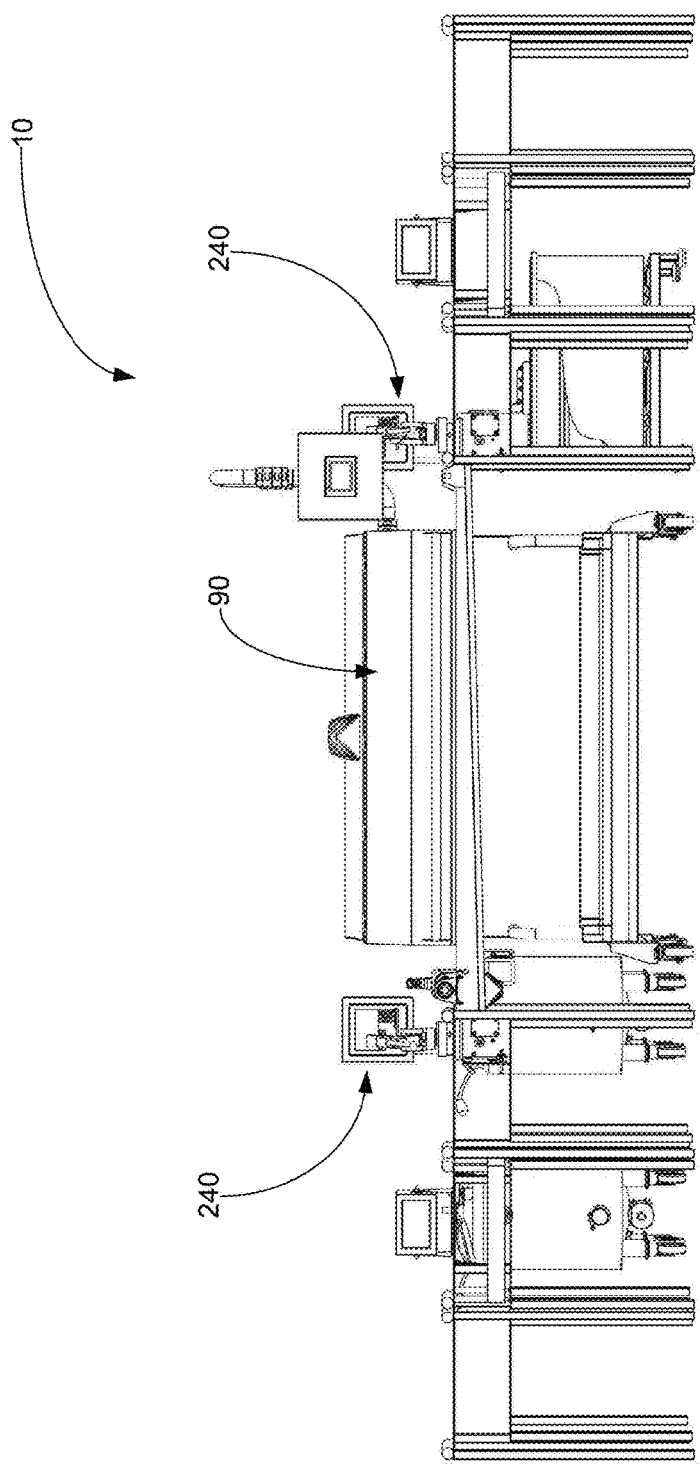

In yet another example, some embodiments of the described system 10 comprise one or more probes and/or other sensors that are configured to detect one or more characteristics of a food product that is treated by the system. While such a probe and/or sensor can perform any suitable function, including, without limitation, measuring, sensing, and otherwise determining a tenderness, texture, pH, moisture, temperature, color, size, fat composition, composition, moisture content, freshness, ripeness, and/or any other suitable characteristic of a food product, in some embodiments, one or more probes are used to measure a tenderness of a food product (and/or a test piece of a food product) at one or more times (e.g., before, during, and/or after injectade is applied to the food product). Indeed, in some embodiments, the described system is configured to measure the tenderness of a food product before and after it is treated.

Where the system 10 comprises one or more probes for measuring food product tenderness, the probes can function in any suitable manner. Indeed, in accordance with some embodiments, FIG. 9 shows that each probe 240 comprises a probe tip 245 that is connected to a strain gauge 250 such that when the probe tip is forced against a food product, the strain gauge is able to measure a resistance to pressure and/or otherwise obtain a relative tenderness of such food product. Additionally, while the system can comprise any suitable number of probes, FIGS. 9-14 show some embodiments in which the system 10 comprises two probes 240 with one being disposed before and one being disposed after the cabinet 90. Thus, in some such embodiments, the system can measure tenderness (and/or one or more other characteristics) of a food product before and after the product is treated with injectade.

Figure 15:
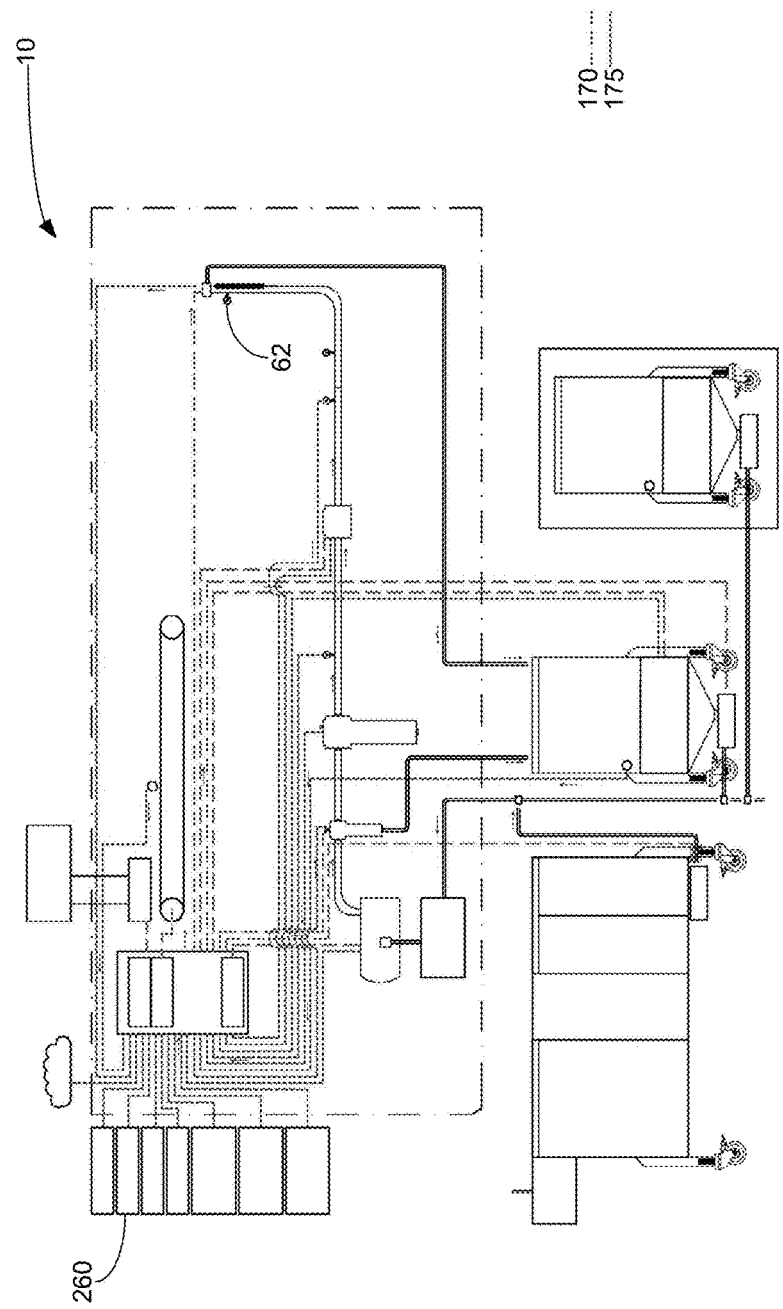
FIG. 15 illustrates a schematic view of the food treatment system in accordance with a representative embodiment of the food treatment system.

Once such one or more probes 240 obtain information regarding the tenderness (and/or any other suitable characteristic) of a food product, such information can be used in any suitable manner. Indeed, in accordance with some embodiments, FIG. 15 shows that the processing unit 75 is configured (e.g., via one or more probe interfaces 260) to record, store, analyze, average, summarize, display, and/or otherwise manipulate such information; adjust injectade application (e.g., adjust injectade pressure, spray time, temperature, penetration depth, etc.), adjust the food product transport's 55 movements, and/or adjust any other parameter of the system 10 based on the obtained information; and/or otherwise use the data/information obtained from such probes.

Thus, in some embodiments, the described systems and methods are configured to transform a food product into a treated food product (e.g., to transform a rough piece of meat into a tender one, to transform a contaminated food product into a decontaminated food product, etc.). Moreover, some embodiments of the system 10 are further configured to measure one or more characteristics of food products being treated and to adjust operation of the system to produce food products having one or more desired characteristics.

In some embodiments, where a probe 240 is used to contact, and thereby test, one or more food products (or food product samples), such a probe is not cleaned between tests. In other embodiments, however, the probe is heated; dipped, sprayed with, bathed with, wiped with, and/or otherwise treated with a sanitizing agent; exposed to UV light; and/or otherwise cleansed. While such cleansing can be accomplished in any suitable manner, in some embodiments, a sanitizing agent is sprayed on and/or otherwise applied to the tip between tests. In some other embodiments, however, the described system 10 is configured to move the probe tips 245 between a testing position and a sanitation position in which a sanitizing agent is applied (via dipping the probe tip in the agent and/or otherwise applying the agent to the tip), such that the tips can be cleaned between tests (and/or at any other suitable time).

In another example of a suitable modification, in some embodiments, one or more components of the system 10 (e.g., the food product transport 55 and/or any other suitable components) are configured to be cleaned (e.g., by being readily removable, by being configured to be cleaned while coupled to the system, and/or in any other suitable manner). Indeed, in some embodiments, the food product transport comprises one or more removable conveyor belts, shaft rails, and/or other parts for cleaning. Moreover, in some embodiments, the system comprises one or more continuous belt cleaners, UV lights, spraying mechanisms, washing mechanisms, and/or other features that allow one or more components of the system to readily be washed, rinsed, sanitized, and/or otherwise cleaned.

In still another example of a potential modification, some embodiments of the described system 10 comprise one or more self-cleaning nozzle heads 125. In such embodiments, the nozzle heads can clean themselves in any suitable manner, including, without limitation, by being flushed with one or more rinse and/or cleaning agents (e.g., from the wash apparatus 65 (or elsewhere)), by being placed in an ultrasonic bath, by contacting and/or by being contacted (e.g., by being sprayed with, dipped in, and/or otherwise coming in contact) with a cleaning and/or rinse agent, and/or in any other suitable manner.

Figure 16A:
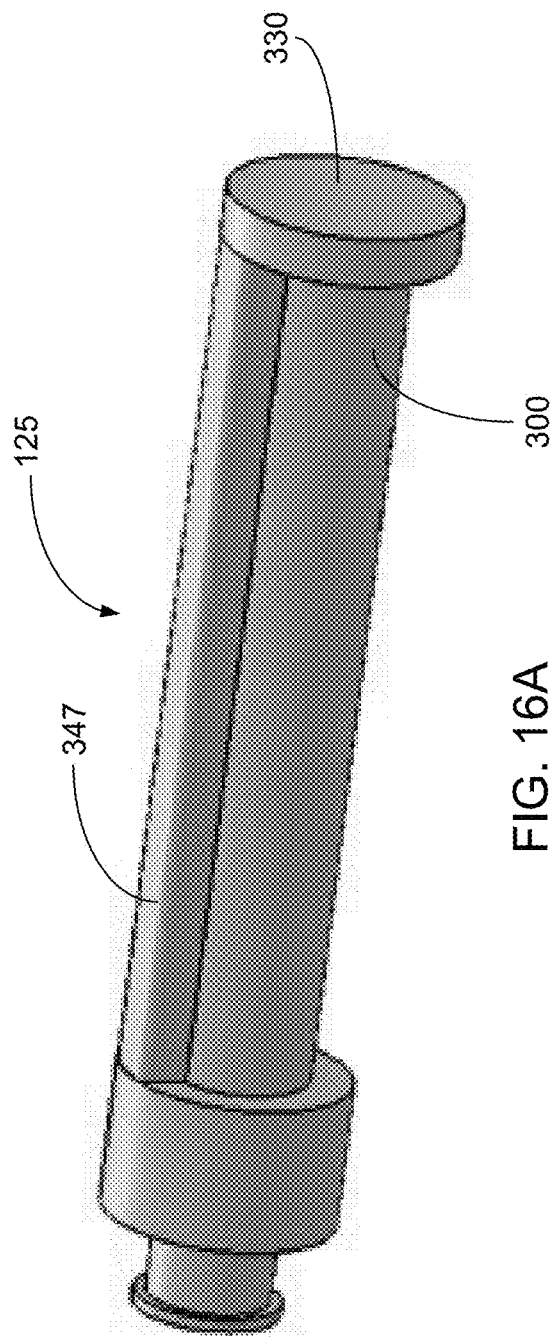
FIG. 16A illustrates a perspective view of a representative embodiment of a spray nozzle head.

In some embodiments, however, the nozzle head 125 is configured to rinse (and/or otherwise clean) one or more sets of nozzles 50 while another set, or multiple sets, of nozzles are configured to apply injectade to a food product. Thus, in some embodiments, the system 10 can clean a first set of nozzles while a second set is injecting (or otherwise applying) injectade. Similarly, in some embodiments, while the first set of nozzles is spraying injectade, the second set of nozzles can be cleaned. As a result, in some embodiments, the system's nozzles can continually be cleaned, without necessarily taking the system offline and preventing it from treating food products.

Where the nozzle head 125 comprises multiple sets of nozzles 50 and is configured to allow one set of nozzles to apply injectade while another set is being cleaned, the nozzle head can comprise any suitable component or characteristic that allows it to function in such a manner. By way of illustration, FIGS. 16A-16E show some embodiments in which the nozzle head 125 comprises multiple sets of nozzles 50. In particular, while the head can comprise any suitable number of nozzle sets (including, without limitation, 1, 2, 3, 4, 5, 6, 7, 8, 9, or more), with a set being one or more nozzles in a given location (e.g., one side of the head, a portion of the head, in one general location, etc.), FIGS. 16C and 16D show some embodiments in which the nozzle head 125 comprises a conduit 300 having a first set 305 and a second set 310 of nozzles 50. Additionally, while FIGS. 16C and 16D show that, in some embodiments, the first 305 and second 310 sets of nozzles 50 are disposed on substantially opposite portions of the conduit, in some other embodiments, the nozzle sets are disposed in any other suitable location that allows the self-cleaning head to function as described herein.

In some embodiments, in which the nozzle head 125 comprises multiple sets of nozzles 50 (e.g., the first 305 and second 310 sets), the head is configured such that when one set of nozzles (e.g., the first set 305) is in a spray position (or a position in which it can apply injectade to a food product), one or more other sets of nozzles (e.g., the second set 310) is in a cleaning position (or a position in which fluid can be passed through such nozzles without being applied to the food product). While the head can be configured to move the various sets of nozzles between the spray and the cleaning position in any suitable manner, including, without limitation, by rotating the conduit, sliding the conduit, translating the conduit, and/or otherwise moving the conduit between the cleaning position and the spray position (or vice versa), FIGS. 16A-16E illustrate some embodiments in which the conduit 300 is configured to rotate between the spray and the cleaning position and vice versa (e.g., via one or more motors, pneumatic actuators, linear actuators, servos, hydraulic actuators, electric actuators, mechanical actuators, air cylinders, and/or other mechanical movement device).

While the nozzle head 125 can function in any suitable manner, FIGS. 16C and 16D show that, in some embodiments, when a nozzle set (e.g., the first 305 or the second 310 set) is in the spray position, injectade is introduced through one or more inlet channels 315 (e.g., in the direction of arrow 320), where it is allowed to be sprayed from the adjoining nozzles 50. Additionally, FIG. 16C shows that, in some embodiments, the nozzle head 125 comprises one or more risers 325 extending from, and in fluid communication with, the channels 315 corresponding to the nozzle set that is in the spray position. In this regard, the risers can comprise any channel, duct, recess, canal, tubing, piping, and/or other feature that allows one or more gases (e.g., air) that are introduced into the nozzle head prior to and/or with the injectade to rise above the injectade in the channel and to be vented out of the nozzle head (e.g., via one or more ducts (such as an duct 335, in the direction of arrow 340), through one or more purge valves 60, by being drained to the injectade tank 15 and/or a drain via one or more drain conduits 165, by being be vented to air, etc.) without being forced through one or more nozzles.

While the risers 325 can be disposed in any suitable location, FIG. 16C shows an embodiment in which the riser 325 is disposed in an endcap 330, which allows the riser to be used to vent air (and/or other gases) from either the first 305 or the second 310 set of nozzles 50 when either set is in the spray position. Thus, in some embodiments, as injectade is introduced into a channel (e.g., inlet channel 315) when a set of nozzles is in the spray position (e.g., the first set 305, as shown in FIG. 16C), air (and/or other gases) that is introduced into the channel can rise above the injectade and be purged from the system. In some embodiments, once air has been purged from the nozzle head 125, the system 10 can function in any suitable manner, including, without limitation, by closing the purge valve 60; by leaving the purge valve open to allow any residual air to escape the heads without passing through the nozzles, with any injectade that passes through purge valve (e.g., without contacting the food product) being redirected to the injectade tank 15; by allowing air to escape the purge value while preventing liquids from also escaping the valve; and/or in another other suitable manner.

FIGS. 16C and 16D further show that, in accordance with some embodiments, when one or more sets of nozzles 50 (e.g., the second set 310, as shown in FIGS. 16C-16D) are in the cleaning position, the system is configured to introduce one or more cleaning and/or rinsing agents into one or more corresponding inlet channels 317 (e.g., in the direction of arrow 349) and to force such agents through the channels and corresponding nozzles. Accordingly, by forcing the fluids through the channels and nozzles (e.g., via the wash apparatus 65 and/or otherwise), the system can remove unwanted debris, mineral build up, and/or other materials from the nozzles. Additionally, while some embodiments of the nozzle head comprise one or more risers that are configured to allow air to be purged from the nozzle set that is in the cleaning position, FIG. 16C shows that, in some embodiments, the system does not comprise a riser for the inlet channel 317 corresponding to the nozzles that are in the cleaning position (e.g., the second set 310 of nozzles 50 in FIG. 16C). As a result, in some embodiments, any cleaning and/or rinsing agents are forced, at any suitable pressure (including, without limitation, between about 50 psi and about 6,000 psi, or any sub-range thereof) to exit the inlet channel of the nozzle set being cleaned through the nozzles, to clean the nozzles.

Figure 16B:
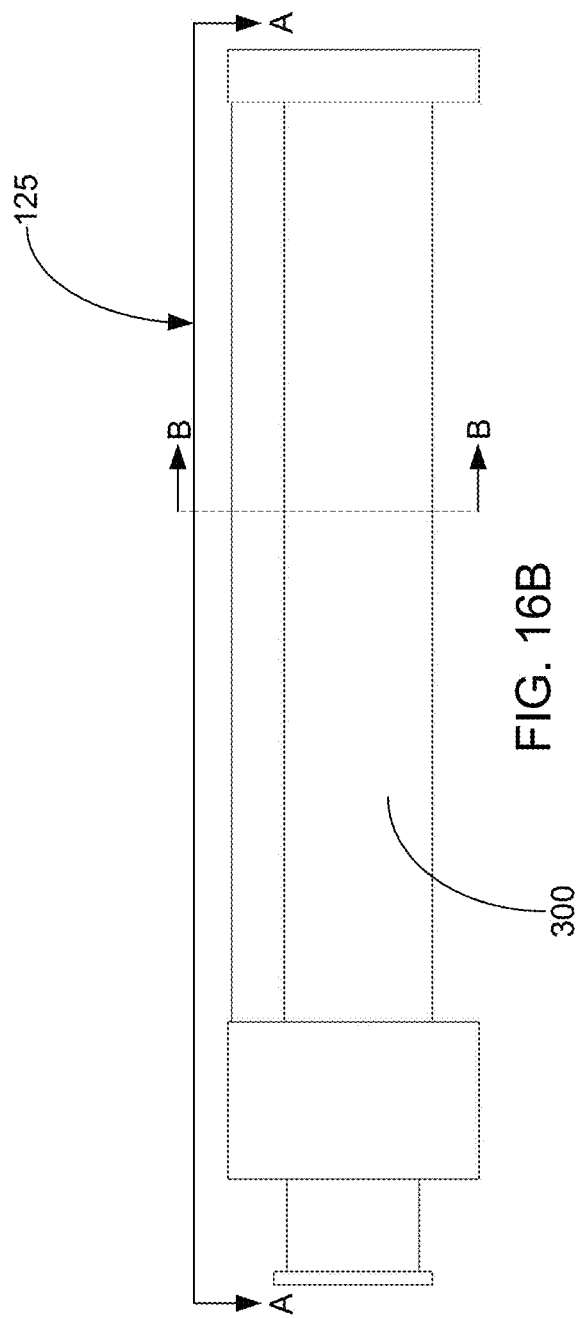
FIG. 16B illustrates a front schematic view of a representative embodiment of the spray nozzle head.
Figure 17A:
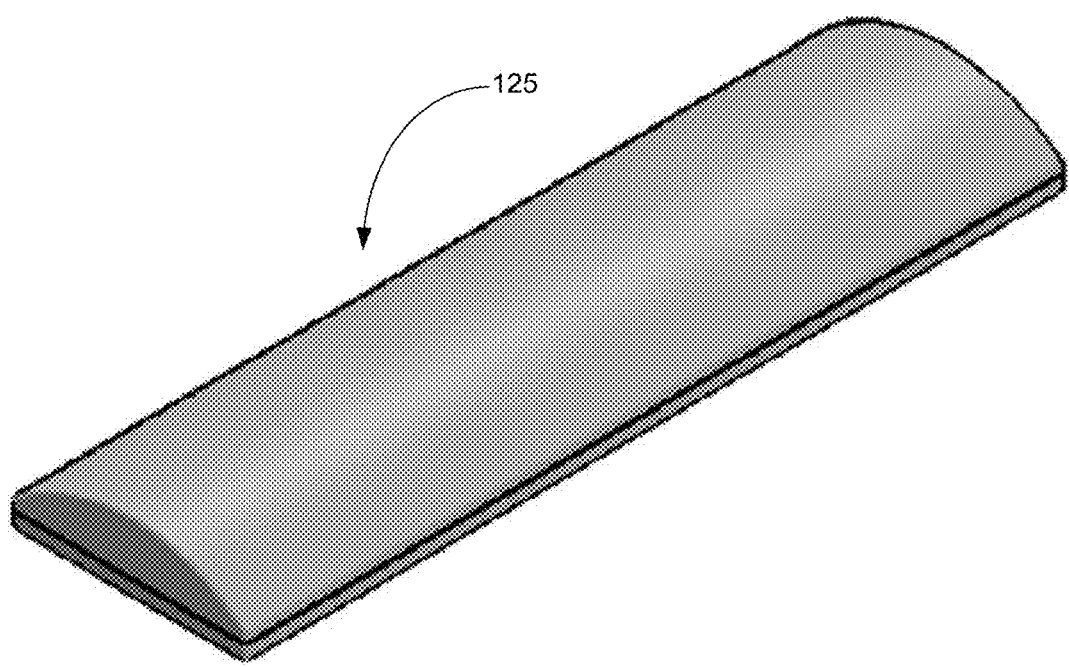
FIG. 17A illustrates a prospective, back side view of a representative embodiment of the spray nozzle head.
Figure 17B:
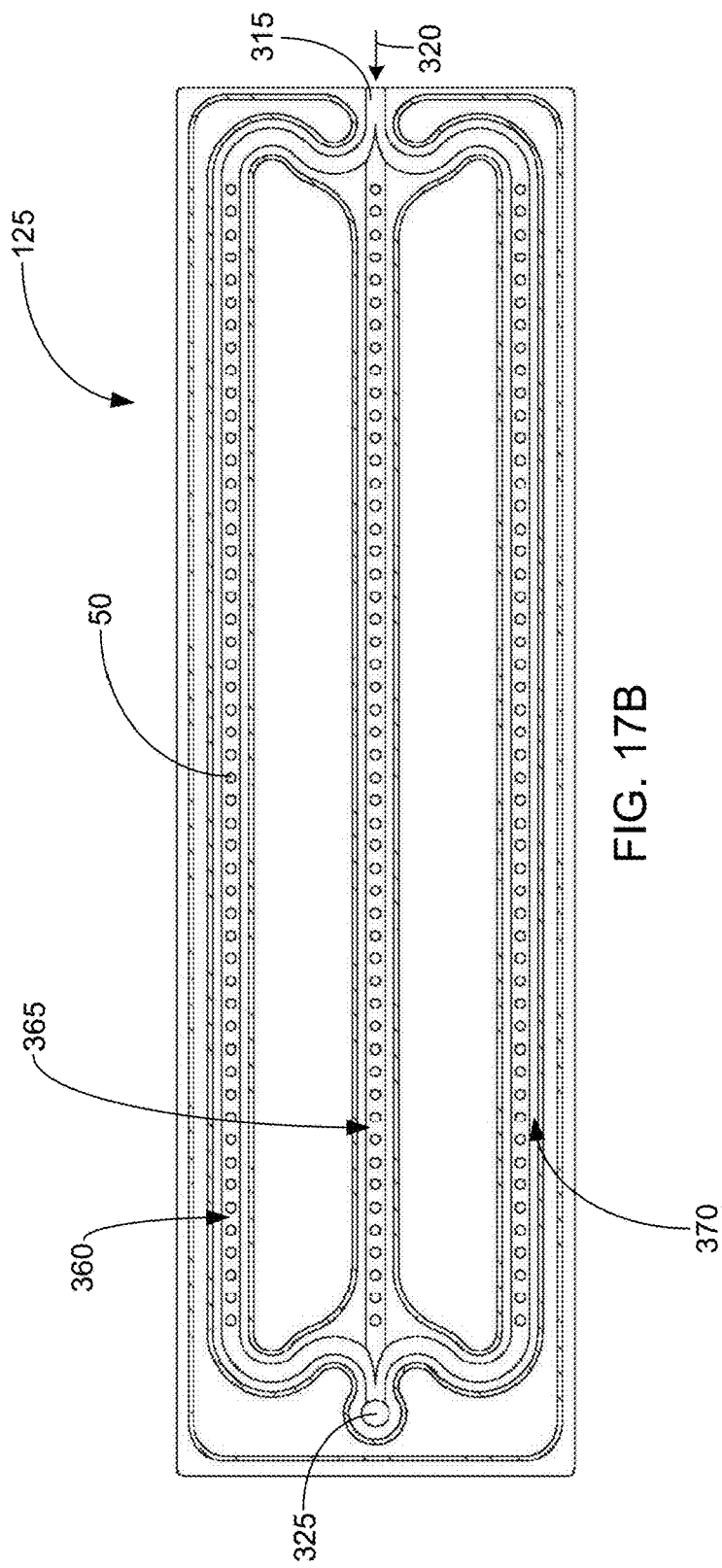
FIG. 17B illustrates a face view of a representative embodiment of the spray nozzle head.
Figure 17C:
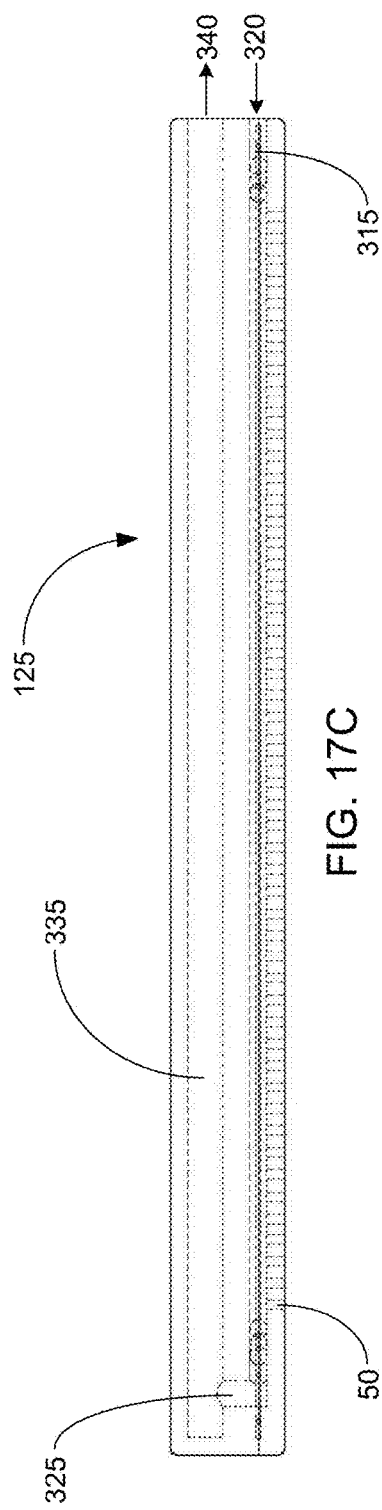
Figure 17D:
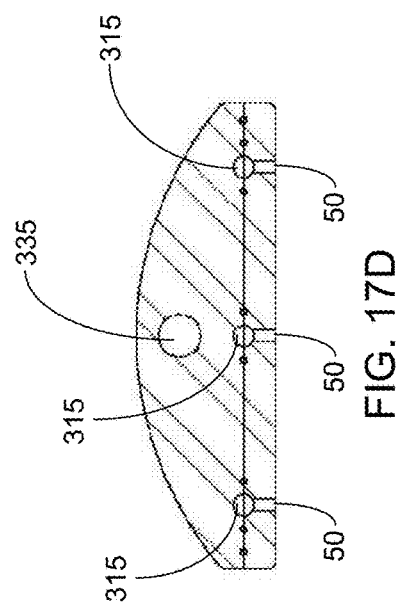

As mentioned, some embodiments of the system 10 are configured to allow one or more sets of nozzles 50 on the nozzle head 125 to apply injectade to a food product while one or more other sets of nozzles on the head are being cleaned. In such embodiments, the cleaning and/or rinsing agents that are used to clean the nozzles that are in the cleaning agents may be handled in any suitable manner, including, without limitation, by being allowed to be sprayed freely within the cabinet 90, by being directed through a duct away from the food product, and/or in any other suitable manner. By way of non-limiting illustration, FIGS. 16B-16D show that, in some embodiments, a portion of the conduit 300 is received by a sleeve and/or other housing 347 that defines an exit duct 345 and comprises one or more seals 350 between it and the conduit 300 so as to direct any cleaning and/or rinsing agents out of the nozzle head 125 (e.g., in the direction of arrow 355) to a drain, storage tank, and/or to any other suitable location. Accordingly, in some embodiments, the system is configured to allow one set of nozzles of a nozzle head to inject and/or otherwise apply injectade into a food product, while another set of nozzles on the same head are being cleaned, without exposing the food product to the cleaning and/or rinsing agent.

One or more sets of nozzles 50 of the nozzle head 125 can be cleaned at any suitable time, including, without limitation, at a time directed by a user, an administrator, the processing unit 75, and/or at any other suitable time. In some embodiments, however, the system is configured to clean a set of nozzles after a particular amount of usage time, after a certain amount of fluid has passed through the nozzles, as the system determines that one or more nozzles have become at least partially occluded (e.g., by comparing pressure readings from a pressure gauge in fluid communication with the head (e.g., pressure sensor 62 shown in FIG. 15) with pressure readings from one or more other pressure gauges in the system (e.g., gauges 40, 42, 44, 46, etc.)), and as the system otherwise determines appropriate. Thus, in some embodiments, the system itself may determine when a set of nozzles should be cleaned. Moreover, in some such embodiments, the system can clean the nozzle sets without substantially impacting the system's ability to treat food product.

As another example of a suitable modification, FIGS. 17A-17F show that, in some embodiments, a single head comprises 1, 2, 3, 4, 5, 6, or more sets (e.g., 360, 365, 370, etc.) of nozzles 50. Additionally, while each set of nozzles can comprise one or more of its own risers 325 and/or ducts 335, FIGS. 17B-17F show some embodiments in which the head 125 is configured to act as a manifold that allows air to be purged from head through one or more shared risers 325 and ducts 335.

In still another example of a modification, in some embodiments, the system 10 comprises one or more mixing vessels and/or feed vessels. In this regard, such vessels can perform any suitable function (including, without limitation, to mix, store, and/or feed injectade to a desired location) and be disposed in any suitable location (including, without limitation, in the injectade tank 15, in the cabinet 90, in separate vessels, and/or any other suitable location). Indeed, in some embodiments, the mixing vessel and/or the feed vessel allow relatively small batches to be mixed (e.g., via any suitable high sheer mixer, low sheer mixer, blender, paddle, stirrer, magnetic stirrer, vibrator, and/or other suitable mixing mechanism) and then fed to one or more nozzles 50.

Figure 18A:
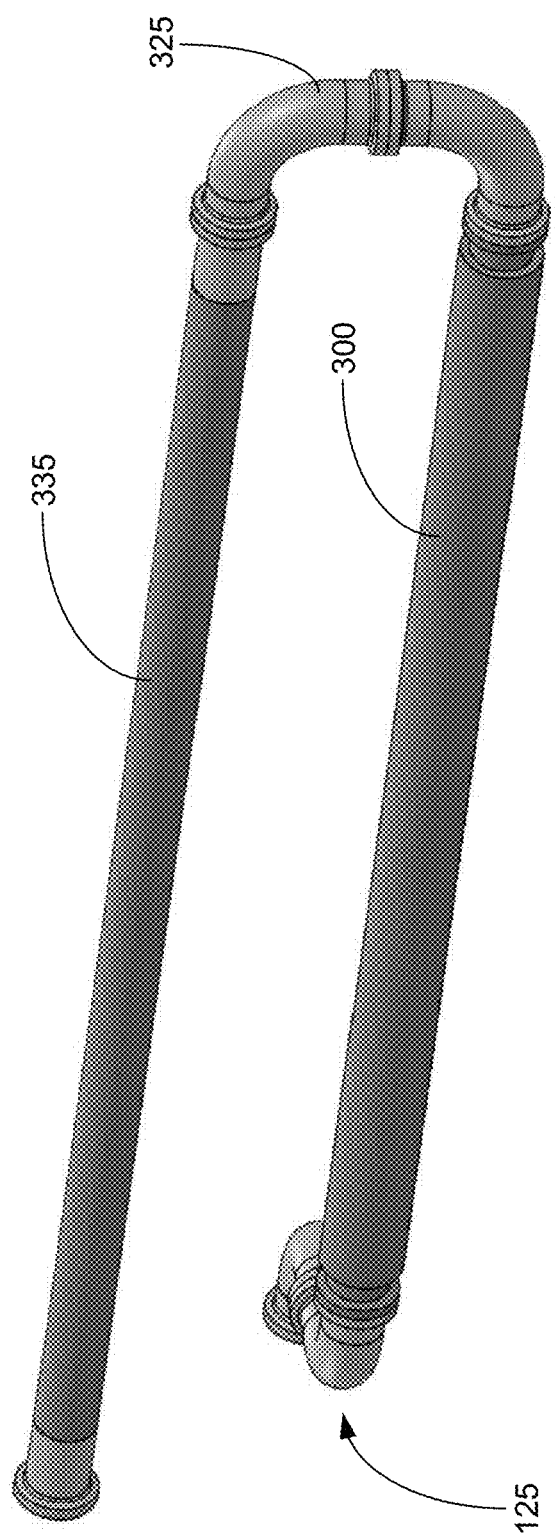
FIG. 18A illustrates a perspective view of a representative embodiment of the spray nozzle head.
Figure 18B:
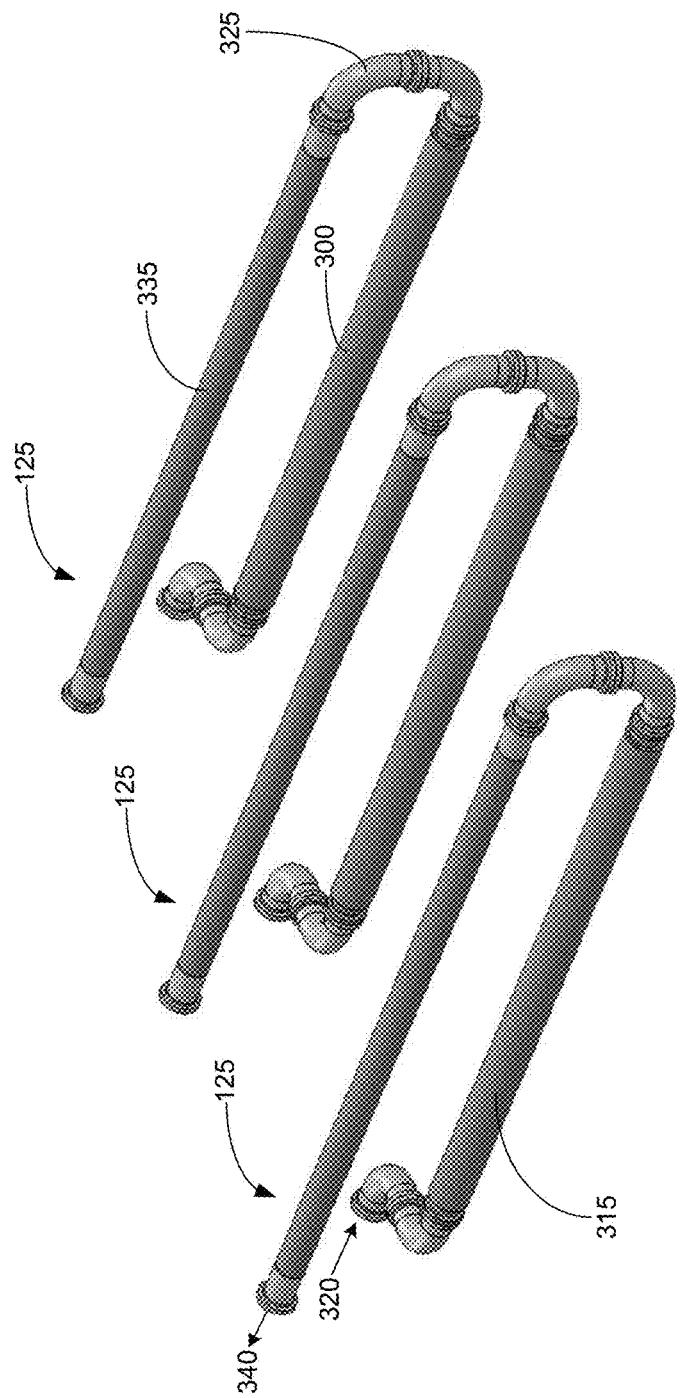
FIG. 18B illustrates a perspective view of three spray nozzle heads in accordance with a representative embodiment.

As yet another example of a suitable modification, FIGS. 18A and 18B show some embodiments in which the spray nozzle head 125 comprises one or more elongated conduits that define one or more risers 325 to allow air to rise above injectade in the head and to be vented (e.g., in the direction of arrow 340) from the system (e.g., via one or more ducts 335, purge valves 60, drain lines 165, etc.).

In addition to the aforementioned features, the described food treatment system 10 can comprise any other suitable feature. Indeed, in some embodiments, the described system is able to inject injectade into a food product without ever having the nozzles 50 touch (and potentially contaminate) the food product.

In another example, in some embodiments of the system, the injectade comprises liquid nitrogen. In this example, the liquid nitrogen can be used to freeze or chill a food item from the inside out.

In another example, some embodiments of the described system are configured in such a manner that the penetration depth of the injectade into a food item is adjustable. For instance, in some embodiments in which the food item comprises a fillet of fish, the system can be configured to inject the injectade into the fish through the cut surface, without penetrating the fish's skin that covers the opposing side of the fillet.

In still another example, in some embodiments, the described system 10 is configured to inject fluid (e.g., injectade and/or any other suitable material) into a food product to increase the weight of (e.g., pump up) such product. In this regard, the system can increase the weight of a food product through injection by any suitable amount, including, without limitation, by between about 0.01% and about 45%, or by any sub-range thereof. Indeed, in some embodiments, the system is configured to inject injectade into a food product to increase the weight of the food product by between about 1% and about 22% (e.g., by about 15%±5% (or any other amount between about 0.01% and about 45%)).

In still another example, although some conventional systems for tenderizing food products inject injectade through the use of one or more needles, which can significantly damage the food product, some embodiments of the described systems and methods that inject injectade into a food product without the use of needles that penetrate into the food product, cause little to no damage to the food product. Accordingly, some embodiments of the described systems and methods are configured to waste less food product than are some conventional systems.

The described food treatment system 10 can comprise any suitable materials that allow it to function as intended. Indeed, in some embodiments, the food treatment system comprises one or more metals, plastics, types of glass, ceramics, synthetic materials, types of fiberglass, polymers, natural materials, and/or other suitable materials. Indeed, in some embodiments, one or more of the nozzle heads 125 comprise stainless steel.

The described food treatment system 10 can also be made in any suitable manner. In this regard, some non-limiting examples of methods for making the described food treatment system include, cutting, folding, bending, molding, shaping, extruding, connecting various pieces with one or more adhesives, mechanical fasteners (e.g., clamps, rivets, crimps, pins, brads, nails, staples, pegs, clips, threaded attachments, couplers, etc.), welding pieces together, connecting pieces together, and/or any other suitable method that allows the described food treatment system to perform its intended functions.

Representative Operating Environment

The described systems and methods can be used with or in any suitable operating environment and/or software. In this regard, FIG. 19 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions. In this regard, in some embodiments, the processing unit 75 (described above) comprises a specialized processing unit that is configured for use with the described system 10.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 19:
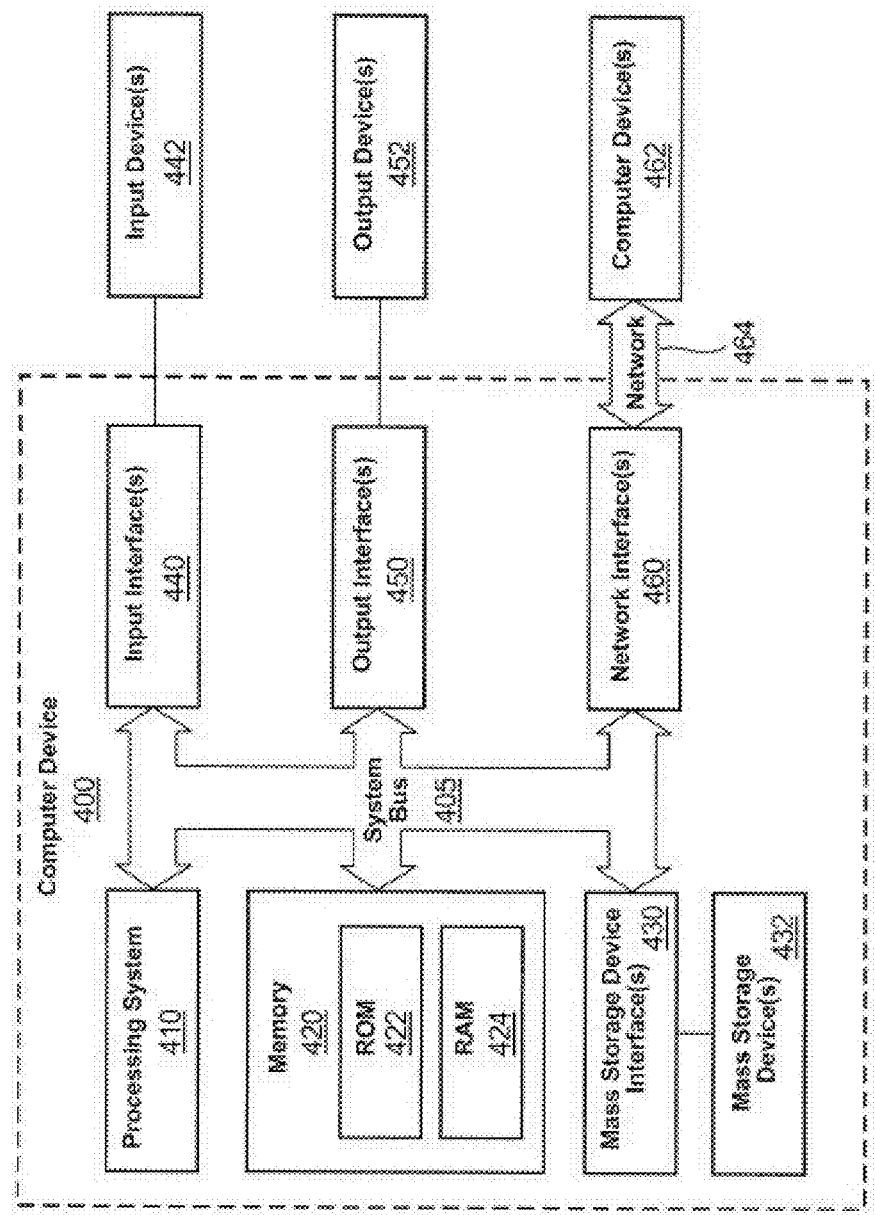
FIG. 19 illustrates a representative system that provides a suitable operating environment for use with some embodiments of the food treatment system.

With reference to FIG. 19, a representative system includes computer device 400 (e.g., a digital ratings device or other unit), which may be a general-purpose or special-purpose computer (e.g., processing unit 75). For example, computer device 400 may be a personal computer, a notebook computer, a PDA or other hand-held device, a workstation, a digital pen, a digital ratings device, a digital ratings device dock, a digital ratings device controller, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 400 includes system bus 405, which may be configured to connect various components thereof and enables data to be exchanged between two or more components. System bus 405 may include one of a variety of bus structures including a memory bus or memory controller, a peripheral bus, or a local bus that uses any of a variety of bus architectures. Typical components connected by system bus 405 include processing system 410 and memory 420. Other components may include one or more mass storage device interfaces 430, input interfaces 440, output interfaces 450, and/or network interfaces 460, each of which will be discussed below.

Processing system 410 includes one or more processors, such as a central processor and optionally one or more other processors designed to perform a particular function or task. It is typically processing system 410 that executes the instructions provided on computer readable media, such as on the memory 420, a magnetic hard disk, a removable magnetic disk, a magnetic cassette, an optical disk, or from a communication connection, which may also be viewed as a computer readable medium.

Memory 420 includes one or more computer readable media (including, without limitation, non-transitory computer readable media) that may be configured to include or includes thereon data or instructions for manipulating data, and may be accessed by processing system 410 through system bus 405. Memory 420 may include, for example, ROM 422, used to permanently store information, and/or RAM 424, used to temporarily store information. ROM 422 may include a basic input/output system ("BIOS") having one or more routines that are used to establish communication, such as during start-up of computer device 400. RAM 424 may include one or more program modules, such as one or more operating systems, application programs, and/or program data.

One or more mass storage device interfaces 430 may be used to connect one or more mass storage devices 432 to the system bus 405. The mass storage devices 432 may be incorporated into or may be peripheral to the computer device 400 and allow the computer device 400 to retain large amounts of data. Optionally, one or more of the mass storage devices 432 may be removable from computer device 400. Examples of mass storage devices include hard disk drives, magnetic disk drives, tape drives, solid state mass storage, and optical disk drives.

Examples of solid state mass storage include flash cards and memory sticks. A mass storage device 432 may read from and/or write to a magnetic hard disk, a removable magnetic disk, a magnetic cassette, an optical disk, or another computer readable medium. Mass storage devices 432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 440 may be employed to enable a user to enter data (e.g., initial information) and/or instructions to computer device 400 through one or more corresponding input devices 442. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 440 that may be used to connect the input devices 442 to the system bus 405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 450 may be employed to connect one or more corresponding output devices 452 to system bus 405. Examples of output devices include a monitor or display screen, a speaker, a wireless transmitter, a printer, and the like. A particular output device 452 may be integrated with or peripheral to computer device 400. Examples of output interfaces include a video adapter, an audio adapter, a parallel port, and the like.

One or more network interfaces 460 enable computer device 400 to exchange information with one or more local or remote computer devices, illustrated as computer devices 462, via a network 464 that may include one or more hardwired and/or wireless links. Examples of the network interfaces include a network adapter for connection to a local area network ("LAN") or a modem, a wireless link, or another adapter for connection to a wide area network ("WAN"), such as the Internet. The network interface 460 may be incorporated with or be peripheral to computer device 400.

Figure 20:
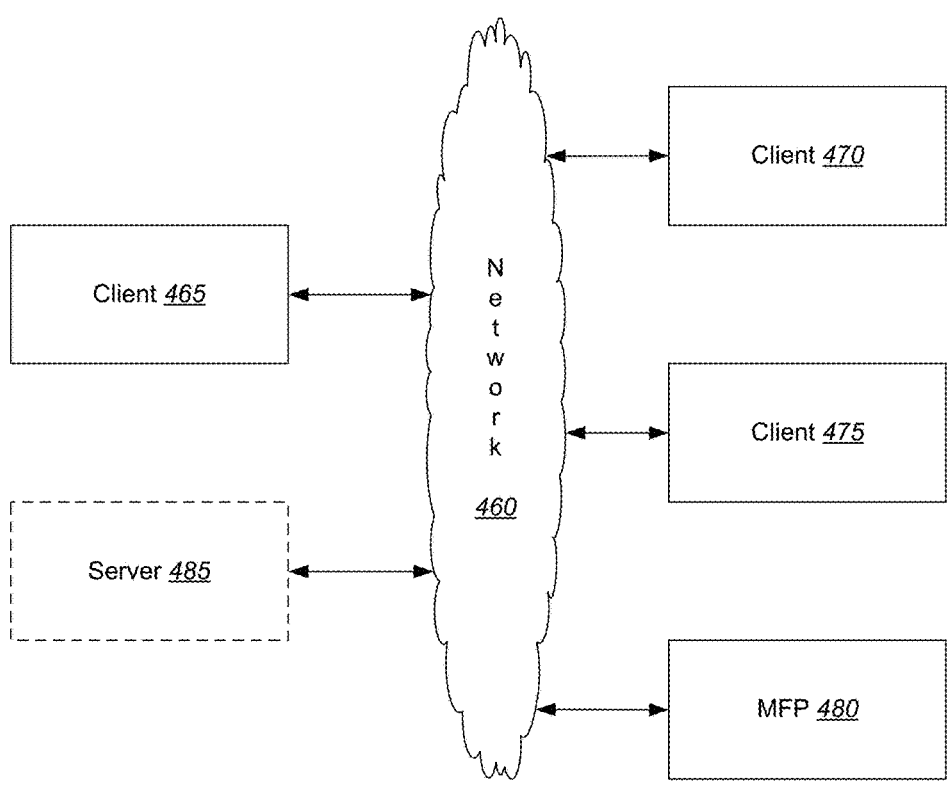
FIG. 20 illustrates a representative embodiment of a networked system that provides a suitable operating environment for use with some embodiments of the food treatment system.

In a networked system, accessible program modules or portions thereof may be stored in a remote memory storage device. Furthermore, in a networked system computer device 400 may participate in a distributed computing environment, where functions or tasks are performed by a plurality networked computer devices. While those skilled in the art will appreciate that the described systems and methods may be practiced in networked computing environments with many types of computer system configurations, FIG. 20 represents an embodiment of a portion of the described systems in a networked environment that includes clients (465, 470, 475, etc.) connected to a server 485 via a network 460. While FIG. 20 illustrates an embodiment that includes 3 clients (e.g., digital ratings devices, etc.) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote monitoring, observation, adjusting, trouble shooting, data collecting, system optimizing, and/or other controlling of the system 10 from many places throughout the world.

Thus, as discussed herein, embodiments of the present invention embrace food treatments. More particularly, some embodiments of the described invention relate to systems and methods for injecting (and/or otherwise applying) an injectate to a food product to: tenderize, limit microbial growth in (or provide intervention to), color, flavor, pump up, and/or otherwise treat the food product. Moreover, while the described systems and methods can include any suitable component, in some cases, they include an injectate reservoir, a filter, a first pump configured to force injectate from the injectate reservoir through the filter, a nozzle that is configured to inject injectate into a food product without having the nozzle contact the food, and a valve that is configured to selectively open and close to regulate when and how much of the injectate that passes through the filter is forced out of the nozzle. In some embodiments, the described system further includes a chiller configured to cool injectate in the reservoir, a sensor to determine a distance between the nozzle and the food item, an actuator configured to move the nozzle, and/or a computer processor that controls an amount of injectate sprayed from the nozzle.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A needleless food product injection system, comprising:
    an injectate source;
    a pump that controllably forces injectate from the injectate source to a needleless spray nozzle head;
    the needleless spray nozzle head, which is configured to receive the injectate from the pump and to inject the injectate into a food product without requiring the neddleless spray nozzle head to contact the food product; and
    a valve that is configured to selectively open and close to regulate when and how much of the injectade is forced out of the neddleless spray nozzle head,
    wherein the needleless spray nozzle head comprises an elongated member having multiple internal fluid channels that extend across a length of the elongated member, wherein the needleless spray nozzle head comprises a manifold system having a first manifold portion disposed at a first end of the needleless spray nozzle head, and wherein each of the internal fluid channels is in fluid communication with a plurality of needless nozzles and the first manifold portion,
    wherein the internal fluid channels are each fixed in location with respect to each other within the needleless spray nozzle head, and
    wherein the manifold system further comprises a second manifold portion that is disposed at a second end of the needleless spray nozzle head, and wherein each of the internal fluid channels is in fluid communication with the first manifold portion and the second manifold portion.

2. The system of claim 1, wherein the needleless spray nozzle head is configured to be automatically raised and lowered with respect to a food product transport that is configured to move the food product past the needleless spray nozzle head.

3. The system of claim 1, wherein the pump comprises a hydra-cell pump that expels the injectate from the needleless spray nozzle head at a pressure that pierces into the food product, through an outer surface of the food product, and into an inner portion of the food product.

4. The system of claim 1, further comprising a pressure regulator and a computer processor, wherein the computer processor is configured to continuously adjust an operation parameter of the pressure regulator.

5. The system of claim 1, further comprising a pressure regulator, a pressure sensor, and a computer processor, wherein the computer processor is configured to continuously adjust an operation parameter of the pressure regulator, based on a reading from the pressure sensor.

6. The system of claim 1, further comprising a pressure regulator bypass line that is at least partially disposed between the pump and the valve, wherein the bypass line is configured to allow a portion of the injectate to flow back into the injectate source when an injectate pressure between the pump and the valve exceeds a set value.

7. The system of claim 1, wherein the injectate source comprises an injectate reservoir that comprises: an inner surface that defines a tank; an outer surface that extends around the inner surface; and a cooling element that is disposed between the inner surface and the outer surface.

8. The system of claim 1, wherein the system comprises a sensor that is configured to determine a distance between a portion of the food product and the needleless spray nozzle head, and wherein the system is configured to automatically change the distance between the portion of the food product and the needleless spray nozzle head based on feedback from the sensor.

9. The system of claim 1, wherein the injectate source comprises an injectate reservoir that comprises a mixing mechanism that is configured to mix the injectate within the injectate reservoir.

10. The system of claim 1, further comprising a first pressure sensor and a second pressure sensor, wherein the first and second pressure sensors are configured to measure a pressure of the injectade within the system, and wherein the system further comprises a computer processor that is in signal communication with the first and second pressure sensors and that is configured to modify an operation parameter of the system based on a difference between readings of the first and second pressure sensors.

11. The system of claim 1, wherein the system is configured such that it will not inject injectade into the food product unless the system is connected to network such that the system is able to convey information regarding injection of the injectade over the network.

12. The system of claim 1, wherein the first manifold portion is configured to direct a first amount of the injectade towards the second end of the needleless spray nozzle head, and wherein the second manifold portion is configured to direct a second amount of the injectade towards the first end of the needleless spray nozzle head.

13. A needleless food product injection system, comprising:
an injectade reservoir;
a pump that controllably forces injectade from the injectade reservoir and through a portion of the system;
a needleless spray nozzle head that receives the injectade from the first pump and expels the injectade at a pressure that pierces into a food product and injects the injectade into the food product without requiring the needleless spray nozzle head to contact, the food product;
a valve that selectively opens and closes to regulate when and how much of the injectade is expelled from the needleless spray nozzle head; and
a conduit system that passes the injectade from the injectade reservoir to the needleless spray nozzle head,
wherein the pump comprises a diaphragm, hydra-cell pump that expels the injectade from the needleless spray nozzle head at the pressure that pierces into the food product, through an outer surface of the food product, and into an inner portion of the food product, and
wherein the needleless spray nozzle head comprises an elongated member having multiple internal fluid channels that extend across a length of the elongated member, wherein the needleless spray nozzle head comprises a first manifold portion disposed at a first end of the elongated member, and wherein each of the internal fluid channels is in fluid communication with a plurality of needless nozzles and the first manifold portion.

14. The system of claim 13, wherein the manifold system further includes a second manifold portion that is disposed at a second end of the elongated member, wherein the first manifold portion is configured to direct a first amount of the injectade towards the second end of the elongated member, and wherein the second manifold portion is configured to direct a second amount of the injectade towards the first end of the elongated member.

15. The system of claim 13, further comprising pressure regulator, a pressure sensor, and a computer processor, wherein the computer processor is configured to continuously adjust an operation parameter of the pressure regulator, based on a reading from the pressure sensor.

16. The system of claim 13, further comprising two separate cabinets, wherein a computer processor is disposed in a first cabinet and the pump is disposed in a second cabinet.

17. A needleless food product injection system, comprising:
an injectade reservoir;
a needleless spray nozzle head that is configured to inject the injectade into a food product without having the needleless spray nozzle head contact the food product;
a pump configured to force the injectade from the injectade reservoir through the needleless spray nozzle head;
a valve that is configured to selectively open and close to regulate when and how much of the injectade is forced out of the needleless spray nozzle head; and
a food product transfer device that is configured to move the food product past the needleless spray nozzle head,
wherein the needleless spray nozzle head comprises an elongated needleless spray bar that defines multiple internal fluid channels that extend from a first end to a second end of the elongated needleless spray bar, wherein the needleless spray nozzle head comprises a manifold system with a first manifold portion at the first end and a second manifold portion at the second end of the elongated needleless spray bar, wherein the first manifold portion is configured to direct a first amount of the injectade towards the second end of the elongated needleless spray bar, wherein the second manifold portion is configured to direct a second amount of the injectade towards the first end of the elongated needleless spray bar, and wherein each of the internal fluid channels is in fluid communication with the first manifold portion, the second manifold portion, and multiple needleless nozzles.

18. The system of claim 17, further comprising a sensor that is configured to determine a horizontal distance between a portion of the food product and the needleless spray nozzle head, and wherein the system is configured to automatically change the distance between the portion of the food product and the needleless spray nozzle head based on feedback from the sensor.

19. The system of claim 17, wherein each of the internal fluid channels are each fixed in location with respect to each other within the elongated needleless spray bar, and wherein the elongated needleless spray bar substantially extends across a full width of the food product transfer device.

20. The system of claim 17, further comprising a pressure regulator, a pressure sensor, and a computer processor, wherein the computer processor is configured to continuously adjust an operation parameter of the pressure regulator, based on a reading from the pressure sensor.

21. A food product treatment system, comprising:
a fluid source that provides injectade;
a food product transfer device that is configured to move a food product across a portion of the system;
a needleless spray nozzle head is configured to inject the injectade into the food product without requiring the needleless spray nozzle head to contact the food product, wherein the needleless spray nozzle head comprises an elongated needleless spray bar that defines multiple internal fluid channels that extend from a first end to a second end of the elongated needleless spray bar, wherein the needleless spray nozzle head comprises a manifold system with a first manifold portion at the first end and a second manifold portion at the second end of the elongated needleless spray bar, wherein the first manifold portion is configured to direct a first portion of the injectade towards the second end of the elongated needleless spray bar, wherein the second manifold portion is configured to direct a second portion of the injectade towards the first end of the elongated needleless spray bar, and wherein each of the internal fluid channels is in fluid communication with the first manifold portion, the second manifold portion, and a plurality of needleless nozzles;

a pump that forces the injectade from the fluid source to the needleless spray nozzle head, wherein the pump comprises a positive displacement, diaphragm, hydra-cell, variable pump that expels the injectade from the needleless spray nozzle head at a pressure that causes the injectade to pierce, and to be injected, into an inner portion of the food product;

a valve that is configured to selectively open and close to regulate when and how much of the injectade is forced out of the needleless spray nozzle head;

a pressure regulator;

a computer processor that is configured to continuously adjust an operation parameter of the pressure regulator.

22. The system of claim 21, wherein the fluid source comprises an injectade reservoir that is configured to mix the injectade, wherein the food product transport device comprises a conveyor belt, wherein the elongated needleless spray bar substantially extends across a full width of the conveyor belt, and wherein the internal fluid channels are each fixed in location with respect to each other within the elongated needleless spray bar, and wherein the computer processor is configured to adjust the operation parameter of the pressure regulator based on a sensor reading.

* * * * *